Dec. 17, 1968  H. F. COOKE ET AL  3,417,393
INTEGRATED CIRCUIT MODULAR RADAR ANTENNA
Original Filed Sept. 18, 1964  10 Sheets-Sheet 1

INVENTOR
HARRY F. COOKE
TOM M. HYLTIN
BRITTON T. VINCENT, JR.
ATTORNEY

Dec. 17, 1968  H. F. COOKE ET AL  3,417,393
INTEGRATED CIRCUIT MODULAR RADAR ANTENNA
Original Filed Sept. 18, 1964  10 Sheets-Sheet 6

Dec. 17, 1968  H. F. COOKE ET AL  3,417,393
INTEGRATED CIRCUIT MODULAR RADAR ANTENNA
Original Filed Sept. 18, 1964  10 Sheets-Sheet 7

3,417,393
INTEGRATED CIRCUIT MODULAR
RADAR ANTENNA
Harry F. Cooke, Richardson, and Tom M. Hyltin and Britton T. Vincent, Jr., Dallas, Tex., assignors to Texas Instruments Incorporated, Dallas, Tex., a corporation of Delaware
Continuation of application Ser. No. 397,491, Sept. 18, 1964. This application Oct. 18, 1967, Ser. No. 676,362
11 Claims. (Cl. 343—5)

ABSTRACT OF THE DISCLOSURE

A phased array radar system including an array of transmit-receive modules, and manifold structure for providing AC and DC power to the array and for summing output signals from each of the modules, each module including a radiation element and capable of providing power amplification, phase shifting, mixing, and frequency multiplication of a transmitted and/or received signal in the module. Included also is a solid state mixer, frequency multiplier, phase shifter, power amplifier, and scan control system for the radar.

---

This is a streamlined continuation of application Ser. No. 397,491, filed Sept. 18, 1964, now abandoned.

This invention relates to radar involving solid-state microwave modular antenna, and more particularly to modules forming a multi-element phased array antenna.

While this invention is immediately advantageous in connection with construction and operation of airborne radar, it has application to other radar systems such as those used for ground mapping, search and detection, fire control, tracking, and navigation and may be programmed to operate in any one of the above modes or in several of such modes on a time-sharing basis.

Airborne radar systems have been faced with the problems of minimizing the weight and increasing the reliability. Other problems involve the generation of high power microwave energy and the requirements for complex signal process and for computing circuitry. However, major problems in radar have been concerned with auxiliary equipment such as rotary joints, servo motors for the antennas, and the like. Restrictions imposed by such components on reliability exist in the most modern of all transistorized radars produced for airborne service. Further, the use of magnetrons for transmitting, klystrons for local oscillator service, and use of high power transmit-receive (TR) protection devices, all have been found to restrict the reliability of the system.

The present invention is directed to an improved radar antenna module in which solid-state circuitry is so constructed that a radar system based thereon may overcome the major obstacles heretofore encountered in the development of solid-state radar, namely, the generation of high power microwave energy. This problem may be overcome by use of a solid-state functional electronic module for constructing a modular antenna array responsive to beam steering control. Such modules may be operated at an adequate power level at X-band frequencies of, for example, 9 gc. ($9 \times 10^9$ cycles per second). A light-weight multi-element array antenna may be formed which uses electronic beam scanning and eliminates wave guides, rotary joints, motors, synchros, gears, and other servo components normally essential to a scanning system. A substantial reduction in total volume and weight over known or existing radars is achieved. This is accompanied by a substantial increase in the reliability of the system.

By the present invention, there is provided a solid-state transmitting and receiving module. Each individual antenna module with individual power generation and phase control permits electronic beam steering. The use of solid-state modules, together with microwave transistors, permits operation in the X-band and higher, and thus permit operation in that frequency range required for airborne radar. While the modules are capable of use in a wide variety of other radar and communication installations, they are particularly suitable for airborne applications. Eliminated is the necessity for the magnetron, the local oscillator klystron, and for high power TR protection devices.

Production of output power at the desired frequency involves use of frequency multipliers of integrated circuit construction. Frequency multipliers in general are limited in their power handling capabilities by reason of the extremely small geometry necessary for operation at high frequencies. The present invention involves a modular antenna with RF power generation, frequency multiplication and return signal detection in each module.

In accordance with the present invention, a radar having an antenna formed of a multiplicity of modules forming a planar radiation array translates a low-power pulsed RF carrier in each module to a pulse of power level suitable for antenna excitation.

More particularly, an amplifier for the RF carrier pulses amplifiers the pulses in each module to a power level exceeding that to be applied to the antenna. A frequency-multiplier is connected for excitation of the antenna at a frequency substantially in excess of the frequency of the low-power pulse of RF carrier. A receiver in each module produces a received signal of electromagnetic energy reflected to the antenna following excitation thereof.

Phase control for the antenna excitation and for the received signal may be carried out at low power levels. However, power amplification and frequency multiplication are carried out in each antenna module with integrated circuit construction which includes an integrated circuit mixer for the received signal in each module.

More particularly in accordance with the invention, a radar antenna is provided having a manifold structure. An RF carrier channel, a phase control carrier channel, a local oscillator signal channel, a D.C. supply voltage channel, a plurality of reference voltage input channels and a plurality of IF output channels are included in the manifold. A plurality of antenna modules are supported by the manifold and are all connected to the RF carrier channel, the phase control carrier channel, the local oscillator channel, and the D.C. supply voltage channel. Each module is connected to one of the reference voltage input channels and to one the IF output channels.

In a more specific aspect, each modular structure supports a radiating element and includes a plurality of input lines and output lines. A first semiconductor integrated circuit mixer is connected at one input to one input line. An integrated circuit power amplifier circuit is connected in a first signal channel extending between the mixer and the radiating element. A second integrated circuit mixer and IF preamplifier are connected in a second signal channel leading from the radiating element and the output line and is connected at one mixer input point to one of the input lines.

For a more complete understanding of the present invention and for further objects and advantages thereof, reference may now be had to the following description taken in conjunction with the accompanying drawings in which:

FIGURE 1 diagrammatically illustrates the operation of an aircraft, its antenna array, and the functional electronic block employed to make up the array;

Figure 1:
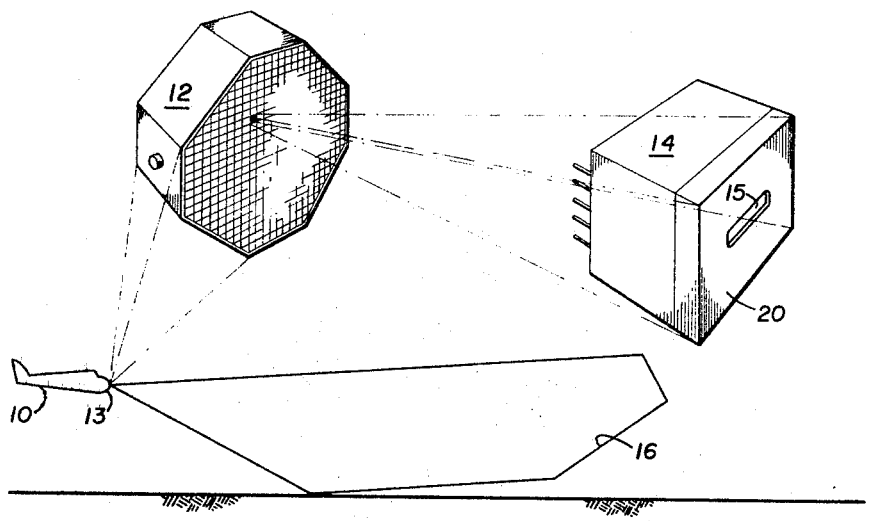

The invention will be described as it is employed in a terrain-following radar. In this system, an aircraft 10 has an antenna unit 12 mounted in the nose 13. Antenna unit 12 is comprised of a multiplicity of functional electronic blocks, such as the block 14. In the example illustrated in FIGURE 1, 448 such blocks make up an antenna array of octagonal shape. The face of each block is of the order of one inch (1″) square. Block 14 is adapted to be plugged into a suitable frame in the antenna unit 12 to transmit and receive electromagnetic energy by way of slot 15.

The video information made available by the radar is then processed to provide terrain-following capabilities. For example, in accordance with one mode of operation employed in a system known as the template system, a pre-master trigger is supplied to the template generator concurrently with each transmitted pulse from the antenna unit 12 to initiate a synthetic echo. This echo or template trigger occurs at a time range that is based upon the desired clearance altitude, the characteristics of the air frame, and the scan position. The range of the template trigger changes with the scan angle. The scan angle is varied by adjusting the relative phase relationship between the microwave energy applied to each of the modules in the antenna unit 12 during one vertical scan. The scan angle defines the template shape such as illustrated in FIGURE 1 by the outline 16. The video return or received signals are compared with the synthetic echos to obtain proportional command signals. The video return signal received before the synthetic echo signal is employed to generate climb commands. Similarly, the video return signal received after the synthetic echo generates dive commands.

Use of the present invention involves a multi-element, phased antenna array of solid-state construction capable of operation as above outlined as well as in other modes. A new and unique structural and functional relationship between integrated semiconductor circuits is employed for antenna excitation and for beam steering any of a plurality of modes.

Figure 2:
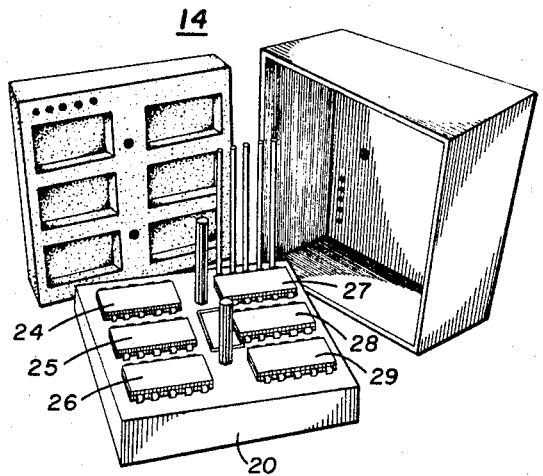
FIGURE 2 illustrates one form of a solid-state antenna module.

The modules of antenna unit 12 are of identical construction and may be of the character illustrated in FIGURES 1 and 2, where a planar face member 20 is provided with a slot 15 leading to microwave circuits which are excited by pulses of an RF carrier of X-band frequency.

Antenna module 14 is unique in that it includes its own power generation circuit and receiver preamplifier circuit and in addition has its own phase shift circuit for beam steering. Included in the block 14 are a plurality of integrated circuits 24–29 which have the same gross appearance as units manufactured and sold by Texas Instruments Incorporated of Dallas, Tex., under the trademark "Solid Circuits."

The size of the module is determined or limited by the allowable spacing between radiating elements for avoidance of spurious grating lobes.

*System block diagram*

Figure 3:
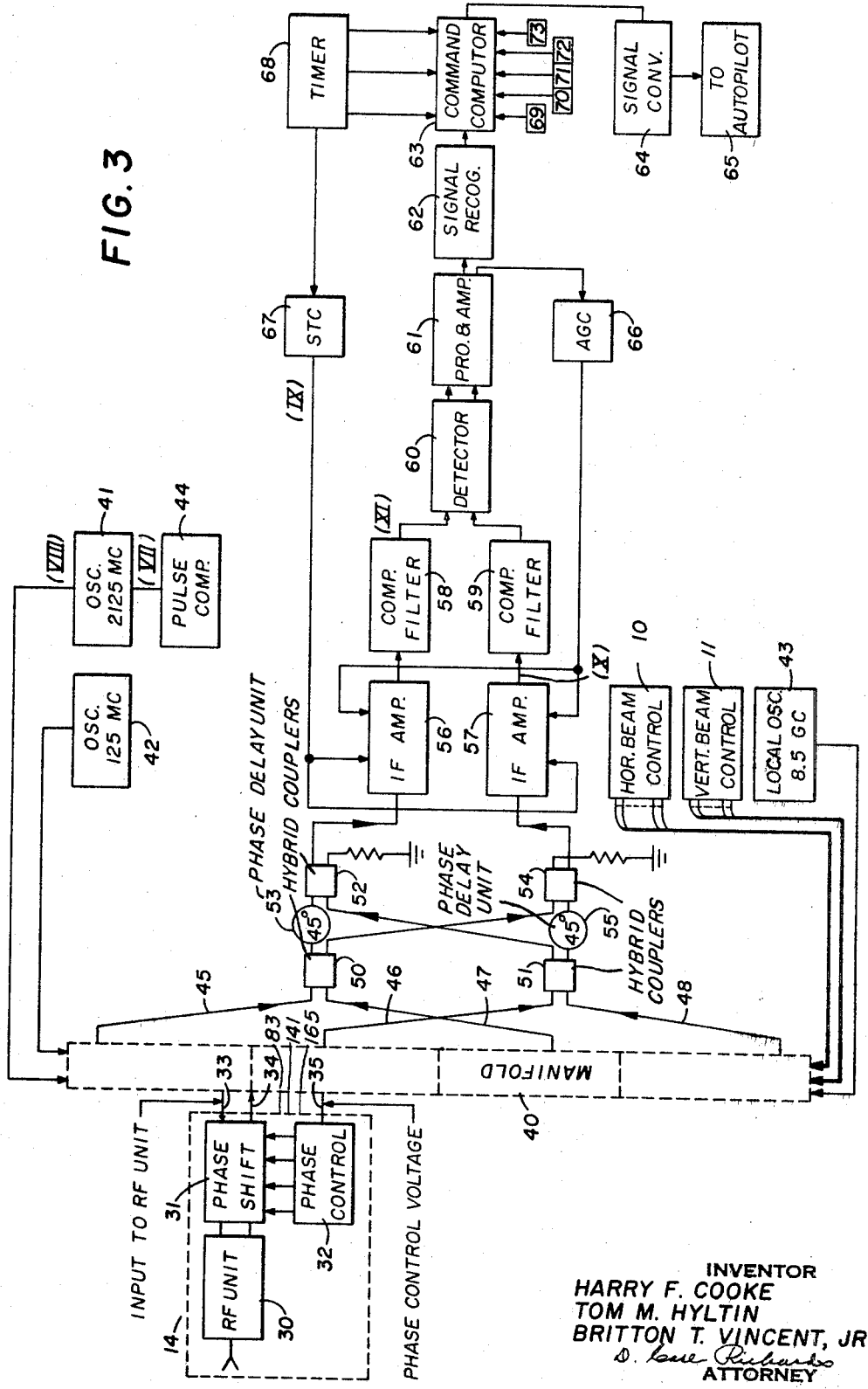
FIGURE 3 is a block diagram of the terrain-following radar of FIGURE 1.

As shown in FIGURE 3, module 14 includes an RF unit 30, a phase shift unit 31, and a control network 32. The phase shift network receives low-power RF carrier pulses by way of a channel 33 and delivers output signals of IF frequency by way of channel 34. A beam steering or phase control voltage is applied to the control network 32 by way of channel 35. While only one module 14 has been shown in FIGURE 3, it is to be understood that the 448 blocks illustrated in the antenna unit 12 of FIGURE 1 will similarly be excited and controlled from a manifold 40.

A source 41 supplies a pulsed RF carrier at 2.125 gc. to manifold 40 under the control of a pulse compression generator 44. An oscillator 42 supplies a pulsed phase control carrier at 125 mc. to the manifold 40. As will hereinafter be explained, the phase control carrier is employed for introducing a selected phase shift into the RF pulse from source 41. A local oscillator 43 applies a continuous low level voltage to manifold 40 at a frequency of 8.5 gc.

Output signals at an IF frequency appear on channel 34 and are applied from module 14 to manifold 40 for processing. As indicated, the IF signals from modules in the upper quarter of the antenna unit 12 are summed and appear on output channel 45. The sum of the IF output signals from the upper center quarter of the antenna unit 12 appears on channel 46. The sum of the IF output signals from the lower center quarter of the antenna unit 12 appears on channel 47, and corresponding signals from the lower quarter of antenna unit 12 appear on output channel 48.

Channels 45 and 47 are connected to the inputs of a 3 db hybrid coupler 50. The signals on channels 46 and 48 are applied to the inputs of a coupler 51. One output from coupler 50 is applied to a coupler 52 by way of a 45° phase delay unit 53. The second input to coupler 52 is supplied by one output of coupler 51. In a similar manner, a fourth coupler 54 is supplied by way of a phase delay unit 55 and by coupler 50. The output signals from couplers 52 and 54 are applied to IF amplifiers 56 and 57, respectively, which in turn feed pulse compression filters 58 and 59. Detectors 60 are driven by output signals from filters 58 and 59 and in turn drive a monopulse resolution improvement processor and video amplifier 61. A signal recognition circuit 62 excited by unit 61 drives a command computer 63, one output of which may be applied by way of a converter 64 to an autopilot 65.

An automatic gain control (AGC) 66 excited by the output of unit 61, controls IF amplifiers 56 and 57. A sensitivity time control (STC) unit 67 also feeds IF amplifiers 56 and 57 under the control of a timer synchronizer 68. Synchronizer 68 also feeds the command computer, as do command input function generators 69–73. Generator 69 is a scan computer indicating the direction of the antenna beam. If an objective is present, then the system generates a control signal for autopilot 65. Generator 70 provides a signal representative of velocity of the aircraft. Generator 71 generates a signal representative of the actual flight vector. Generator 72 is a ride control generator, and determines whether a rough or smooth course is followed, i.e., how abruptly the aircraft will change attitude when a target or obstacle is sensed. Generator 73 generates a signal representative of the aircraft pitch angle.

In the light of the foregoing description and with a knowledge of the various modes of operation of radar, it will be recognized that exacting requirements are placed upon the elements to be included in module 14. In order to provide antenna power at the level necessary, solid-state circuits are employed with circuit configurations such that the necessary power may be supplied to the antenna and the desired versatility and control thereof are available within the capabilities of solid-state semiconductor networks.

*Antenna module circuit*

Figure 4:
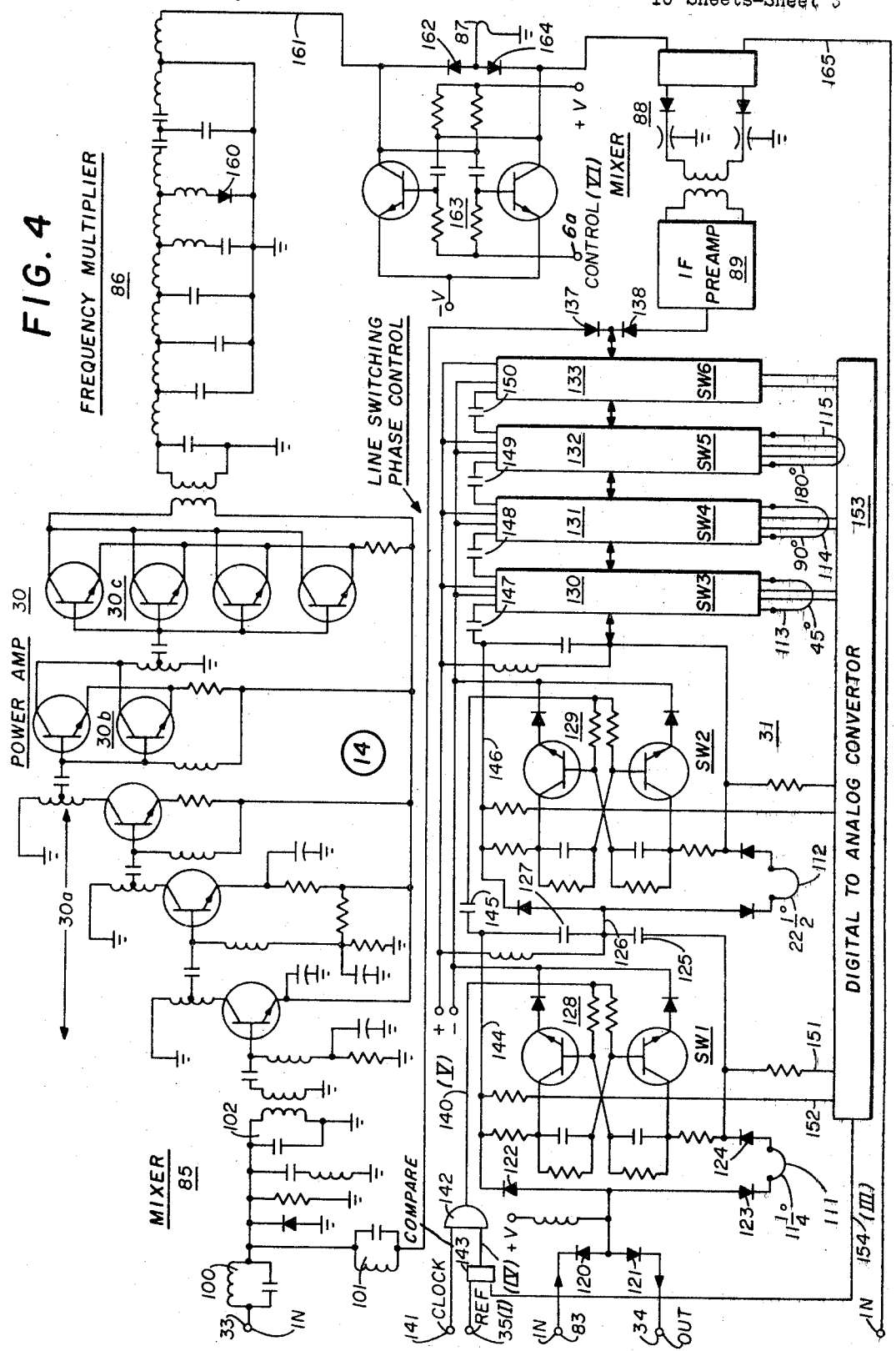
FIGURE 4 is a block diagram of the electronics in each module.

FIGURE 4 is a lumped constant representation of integrated circuits for: (a) receiving compression-modulated RF carrier pulses at a relatively low-power level from channel 33; (b) receiving phase control carrier pulses on channel 83; (c) shifting the phase of the phase control carrier in the phase shift unit 31; (d) modulating the RF pulses with the phase shifted pulses in the mixer 85; (e) amplifying one of the modulation products in the power amplifier 30; (f) stepping up the frequency of the high power signal in the frequency multiplier 86; (g) applying the final output pulses to an antenna 87; (h) detecting return signals to the antenna 87; (i) mixing the same in a mixer 88 at the input of a preamplifier 89; and (j) passing the detected signals from amplifier 89 through the phase shift unit 31 for delivery to an output channel 34.

For the purpose of the present example, the operation will be such that the RF pulses applied to channel 33 will be at a frequency of 2.125 gc., ±0.625 mc., the swing of 1.25 mc. being from low frequency to high frequency by pulse compression generator control of the oscillator 41 as shown in FIGURE 3. The phase control carrier applied to terminal 83 will be at 125 mc. The signal applied to the antenna 87 will be 9 gc. and the output signal on channel 34 will be at 500 mc. The module delivers one watt peak power to the antenna 87 at 9 gc.

The compression-modulated RF carrier pulses applied to the channel 33 pass through a tuned filter 100 at the input of the mixer 85. A second tuned filter 101 is located in the output channel leading from the phase shift unit 31 and is tuned to 125 mc. for modulating the 2.125 gc. carrier pulse. The output circuit 102 is then tuned to the upper side band or 2.250 gc. for driving the power amplifier 30. The phase shifting unit 31 is employed to control the phase of the carrier at the output tuned circuit 102.

Each of the plurality of modules 14 is adapted to be plugged into the manifold 40 so that the RF carrier pulses in a single channel in the manifold 40 are distributed to each of the channels 33, shown in FIGURE 4, of each of the modules 14. The outputs at channel 34 of each of the modules are then summed in a single channel located in the manifold 40 to provide a summed output at the channel 45. A single phase control carrier channel is located in the manifold and provides phase control carrier signals to each of the channels 83 while a plurality of reference voltage input channels in the manifold 40 are respectively connected to channels 35 of each module.

*Phase shifting by line length switching*

Beam scanning is provided for the antenna made up of a plurality of modules 14. As shown in FIGURE 4, beam scanning is produced by switching discrete lengths of transmission line into the antenna feed system and more particularly into the channel through which the 125 mc. phase control carrier is transmitted. This is a step-type phase shifter. The size of the smallest step is important in determining the complexity of the control circuit. In the unit 31, five transmission lines are employed and are of such length as to provide phase delay units 111–115 of 11¼°, 22½°, 45°, 90°, and 180° delays, respectively, at a frequency of 500 mc. The 125 mc. signal applied to terminal 83 will undergo delays one-fourth of the amounts noted.

The phase shifter and switching unit 31 includes diodes 120 and 121 forming an input switch. The common juncture between diodes 120 and 121 is connected to diode swtches 122 and 123. Delay line 111 is connected to diode 123 and thence, by way of diode 124 and condenser 125, to the input channel 126 leading to the second stage of the phase shifter 31. The diode 122 is connected by way of condenser 127 to channel 126. The switches 122, 123, and 124 are selectively biased under the control of a bistable multivibrator 128. A second multivibrator 129 controls transmission through, or the bypass channel for, the second delay line 112. Multivibrators 130, 131, and 132 similarly control inclusion or deletion of lines 113, 114, and 115, respectively, from the transmission channel for the 125 mc. phase control carrier. A sixth multivibrator 133 is connected to the output of multivibrator 132 and in turn feeds a TR switch comprised of diodes 137 and 138.

The switch control line 140 leading to the multivibrator is supplied from a clock input channel 141 at 1 mc. by way of an AND gate 142. The second terminal of the AND gate is fed by voltage comparator unit 143. The line 144 of multivibrator 128 is connected by way of condenser 145 to the input line 146 of multivibrator 129. Similarly, condensers 147–150 connect multivibrators 129–133 in a ripple-through configuration. From zero phase delay, the first clock pulse actuates multivibrator switch unit 128 to include line 111 in the 125 mc. circuit. The second clock pulse actuates units 128 and 129 to remove line 111 and to include line 112. The third pulse actuates unit 128 to include line 111 with line 112. The fourth pulse actuates units 128, 129, and 130 to remove lines 111 and 112 and to include line 113. Thus, a digital progression is employed in increasing the delay in the delay line unit.

The multivibrator 128 is coupled by way of lines 151 and 152 to a digital-to-analog converter 153. Similarly, all of the other multivibrators are coupled to the digital-to-analog converter so that the state of the switching networks is indicated by an analog signal on the output line 154. Switch unit 133, while introducing no delay, applies current to converter 153 proportional to 360° phase delay so that the line switching sequence may continue through two cycles or 720°. The output signal from converter 153 is applied to the second input of the voltage comparator 143.

In operation, a reference voltage representative of the desired phase delay for module 14 is applied to the input terminal 35. So long as the reference voltage exceeds the output from the converter 153, the output from the comparator 143 enables the AND gate 142. With the AND gate 142 conductive, the clock pulses from terminal 141 successively shift conduction between the various flip-flops. When the output of the converter 153 equals the reference voltage on channel 35, the AND gate 142 discontinues transmission of the clock pulses and the desired delay is then fixed in the phase shift unit 31. Thereafter, the simultaneous application of the compressed RF carrier pulse and the phase control carrier pulse to terminals 33 and 83, respectively, will produce a pulse of 2.25 gc. at the output of the tuned circuit 102 in the mixer 85. The phase of the 2.250 gc. signal at circuit 102 is equal to the phase delay in the unit 31.

The signal from mixer 85 is then applied to the power amplifier 30 for delivery of about two watts peak power at 2.25 gc. to the input of the frequency multiplier 86. The multiplier 86 consists of resonant circuits in which a diode 160 is the active element. The multiplier is a quadrupler for delivery to the output channel 161 of a pulse whose frequency is 9 gc. at a peak power level of about one watt. The latter pulse is applied by way of a TR switch diode 162 to the antenna 87 for radiation at the phase set by the phase delay unit 31.

Immediately after pulse transmission from the antenna, the control multivibrator 163 for the TR switch 162, 164 changes state so that return signals detected by the antenna 87 pass through TR switch diode 164 to the input to a mixer 88. The mixer 88 is supplied with an 8.5 gc. local oscillator signal on channel 165. The lower side band modulation product at 500 mc. is applied to the IF preamplifier 89. The latter signal then passes through the switch diode 138 and the phase shift unit 31 where the signal undergoes a delay of four times the delay of the phase control carrier. This is with the same delay unit setting as employed during the transmit operation. The delay IF signal then passes through the output switch diode 121 to the output channel 34 leading to the manifold. While not shown, control units for TR switch 120, 121 and TR switch 137, 138 will provide bias voltages therefor in the same manner as the bias is supplied TR switch 162, 164.

More particularly, it will be recalled that the phase control carrier applied to terminal 83 was at a frequency of 125 mc., and that it passed through the phase shift unit 31 to control the phase of the RF pulse applied to the antenna 87. Since the multiplier 86 quadruples the frequency, the phase shift introduced by the unit 31 is also quadrupled in the antenna drive signal as it appears on channel 161. Thus, with the output of the IF preamplifier 89 at 500 mc., the output signal on channel 34 will have exactly the same phase shift as introduced into the antenna drive pulse. Thus, the same phase shift unit is used for both the transmit and the receive cycle and the beam direction is the same for receiving as for transmitting.

With power amplifier 30 present, module 14 includes its own power generation means and thus operates on low level signals from the manifold. The circuit 30 raises the power level by about 20 db in the preamplifier section 30a, about 6 db in the driver 30b, and about 4 db in the output section 30c. By way of example, the power applied to the input of the preamplifier would be about 2 milliwatts (mw.) peak or 0.2 mw. average power. The signal at the input to the driver 30b would be about 200 mw. peak or 20 mw. average. The power applied to the output stage would be about 800 mw. peak or 80 mw. average. The power output from the output stage would be about 2 watts peak or 0.2 watts average power. In accordance with the construction hereinafter to be described, the multiplier would operate to increase the frequency from 2.25 gc. to 9 gc. with an insertion loss of 3 db to provide one watt peak power to the antenna 87. Thus, the power generation chain consists of 3 or 4 amplifier stages at 2.25 gc. followed by an X4 varactor multiplier with an output at 9 gc.

Mixer

In the system illustrated in FIGURE 4, as in other microwave systems where a high-frequency, low-level return signal is employed, the quality of the receiver largely determines the other system parameters. For operations at frequencies transmitted by antenna element 87, the noinse level of the mixer 88 presents the principal problem and the mixer comprises a critical and principal component of the receiver portion of FIGURE 4.

Mixer 88 converts the received signal to a lower frequency preferably with a minimum of added noise. To optimize the noise level for the receiver, both the signal-to-noise ratio of the mixer and the conversion loss in the mixer must be as low as possible. The detected signal from diode 164 and a local oscillator output signal on line 165 of FIGURE 4 are applied to a semiconductor junction and the difference as IF output signal is extracted.

For operation at frequencies in the X-band, the mixers illustrated in FIGURES 5–12 may be employed. Operation thereof is characterized by low loss, employing high ratio couplers of integrated circuit form.

Figure 5:
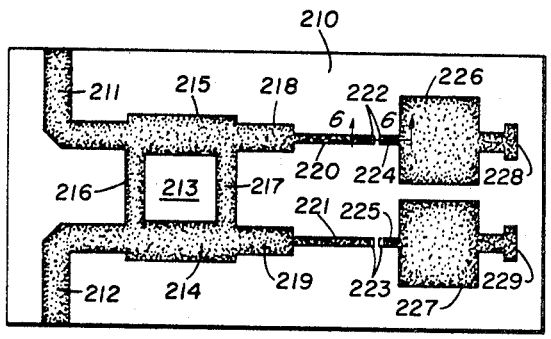
FIGURE 5 is a top view of a solid-state mixer circuit of FIGURE 4 comprising a surface-oriented diode, a strip transmission line, and a coupler.

More particularly, as shown in FIGURE 5, a semiconductor wafer 210 is provided with a signal input strip 211 and a local oscillator input strip 212. Strips 211 and 212 are metalized regions overlaying a high resistivity semiconductor wafer. The metalized regions 211 and 212 lead to the input portions of a hybrid coupler 213. The coupler 213 is provided with parallel sections 214 and 215 which are about one-quarter wavelength long and are of a width substantially greater than the width of the strips 211 and 212. Two shunt strips 216 and 217 are spaced approximately one-quarter wavelength apart and extend between sections 214 and 215. Output lines 218 and 219 extend from the coupler 213.

A pair of quarter-wave transformer sections 220 and 221 extend from the output strips 218 and 219, respectively, and make contact with terminals of surface-oriented diodes 222 and 223, respectively. Output conductors 224 and 225 lead from the other terminals of diodes 222 and 223 to output capacitors 226 and 227 to provide an output signal at output terminals 228 and 229.

With strip-line transmission lines overlaying the semiconductor wafer 210 and with surface-oriented diodes of a construction hereinafter described, a signal in the X-band may be converted to IF with about a 5 db loss. For example, a 9 gc. signal may be applied to strip 211. A local oscillator signal at 8.5 gc. may be applied to the input strip 212. As a result, an IF signal of 500 mc. is produced at terminals 228 and 229.

Figure 6:
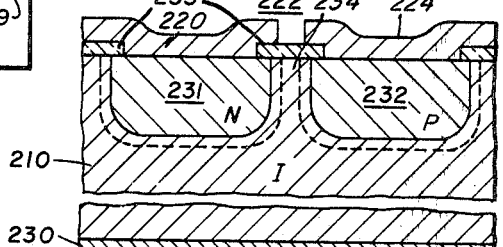
FIGURE 6 is a sectional view taken along line 6—6 of FIGURE 5 illustrating a planar alloy, surface-oriented diode.

The surface-oriented diode 222 is illustrated in one form in FIGURE 6. The wafer 210, of intrinsic silicon, is provided with a ground plane conductive layer 230. The intrinsic silicon forms a high resistivity zone above the ground plane layer 230. An N-type alloyed region 231 and a P-type alloyed region 232 are formed in the surface of the wafer 210 opposite the ground plane layer 230. A silicon dioxide insulating layer 233 is formed over the upper surface of wafer 210 to cover the surface emergence of the junctions forming the boundaries between the P-type and N-type alloyed sections and the intrinsic wafer 210. An N-type metal alloy strip 220 is then formed on the surface of the wafer 210 so as to make electrical contact with the N-type region 231. A P-type metal alloy strip 224 is formed on the surface to make electrical contact with the P-type region 232. The P-type and N-type metal alloy strips 220 and 224 are evaporated onto the surface through holes in oxide masks defined by photolithographic techniques. The metal alloy strips are then alloyed into the silicon to produce the N+ and P+ regions between the strips and the N-type and P-type regions 231 and 232. An intrinsic region 234 is disposed between the N and P regions, the boundary junctions of which are shown in dotted outline.

Such fabrication of the surface-oriented mixer diode is in a form compatible with the integrated circuit construction. The diode is a substantial improvement over conventional microwave mixer elements. Previous mixer diodes have been of the point contact variety in order to maintain low junction capacitance. The present construction has achieved junction capacitances of 0.05 picofarads (pf.) or less. When biased by rectification of the local oscillator signal to obtain the best noise figure, the shunt resistance of the junction of the present invention is approximately 400 ohms. In ordinary mixer diode configuration, this value of resistance is transformed to an input impedance of about 50 to 100 ohms by the package inductance and the junction capacitance. In the present case, the junction diameter of the diode is approximately 0.1 mil (0.0001 inch). Production of a semiconductor junction of this size, as above noted, employs intrinsic silicon having side-by-side alloy zones to form confronting edge junctions that will give the surface diode effect.

The material required for the integrated circuit preferably will provide a suitable substrate for microwave strip transmission lines and for forming the mixer semiconductor junctions. Intrinsic silicon and high resistivity gallium arsenide may be employed for mixer diodes, whereas germanium has characteristics which are not suitable for both the microwave strip transmission line and the diode construction. Where extremely low loss transmission lines are required, low loss dielectrics with deposited silver conductors are employed. Yttrium-iron-garnet (yig) substrates may also be employed for this purpose.

Figure 7:
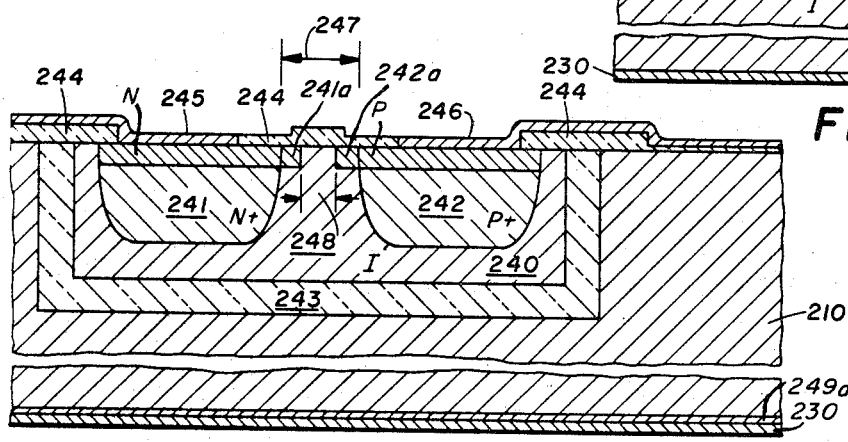
FIGURE 7 is a modified form of surface-oriented diode in which diffusion techniques are employed.

FIGURE 7 illustrates a modified form of surface-oriented diode wherein side-by-side diffusions of opposite-conductivity type impurities are formed on the upper surface of an intrinsic silicon wafer 240. The N-type diffused zone 241a and the P-type diffused zone 242a are characterized by an edge junction that will give the surface diode effect. The zones 241a and 242a are formed partially in N+ and P+ diffusion zones 241 and 242, respectively, which in turn are formed in an insulated island of intrinsic silicon about 1 mil wide and 5 mils long formed in the wafer by an insulating layer 243 of silicon dioxide.

The spacing between the edges of the diffused N+ and P+ zones 241 and 242 is about 0.3 mil in zone 247. However, the zone 248 between the confronting junctions of the N and P zones 241a and 242a is about 0.1 mil wide. The capacitance of the junction is defined by the effective junction area of the shallow diffusions and the reverse breakdown by the shallow diffused spacing and the intrinsic or I-layer concentration. Conductivity modulation under forward current conditions is minimized by reason of the effective increase injection area of the anode of the deep P+ diffusion. The problem is in defining the I-layer between the diffusion fronts so that a sufficient current density can be obtained at reasonable current levels. For currents of 20 milliamps, about a 4 square mil area will give a current density of 200 amps per square centimeter required for conductivity modulation. An insulating layer 244 covers the surface of the wafer except for metalized contact zones 245 and 246.

Surface-oriented diodes of the type illustrated in FIGURES 6 and 7 may be employed in the mixer of FIGURE 5. Where additional current-carrying capacity is required of surface-oriented diodes, as in the transmit-receive switches employed in various systems, the construction such as shown in FIGURE 8 may be employed.

Figure 8:
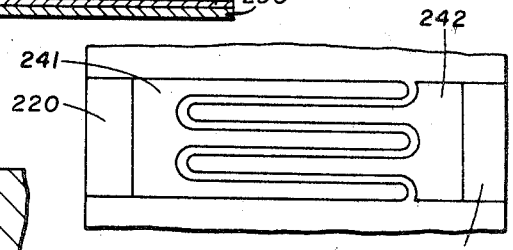
FIGURE 8 is a highly enlarged top view of the surface-oriented diode.

In FIGURE 8, the transmission lines 220 and 224 are shown contacting the diffused zones 241 and 242, respectively. The diffused zone 241 has three fingers. The zone 242 has two fingers with the fingers being enmeshed or interdigitated to provide a junction of high current-carrying capability. Such a construction exhibits low junction capacitance under moderate reversed-bias conditions and low loss.

Intrinsic silicon as the substrate material for the diodes provides insulation isolation for any number of components deposited upon it and also provides a low loss structure. The structure is readily adaptable to receiving strip transmission lines deposited directly onto the silicon. In accordance with one mode of fabrication, a ground plane conductor is evaporated onto the bottom of an intrinsic silicon substrate of approximately 5 mils thickness. Silicon dioxide on the top is etched to expose the silicon where transmission lines are required. Gold is then evaporated over the entire surface and selectively removed to leave gold over the exposed regions of the silicon. Preferably, in order to maintain the propagation properties of the lines, the alloying of gold with silicon will be avoided, as by the forming of a thin layer, a few microns thick, of a material such as molybdenum between the gold strips and the silicon.

As an alternative mode of fabrication, a hot substrate evaporation of gold onto the intrinsic silicon is carried out. The gold is then etched away to leave he transmission lines where required. At microwave frequencies, the degradation of leakage current due to the introduction of the gold into the silicon is of little consequence. In the same manner, aluminum strip transmission lines may be formed on gallium arsenide to form the transmission line pattern on a given substrate. Thus, the mixer of FIGURE 2 is a flat, integrated circuit package. The integrated circuit may be part of more complex circuits formed on the same or interconnected substrates.

Figure 9:
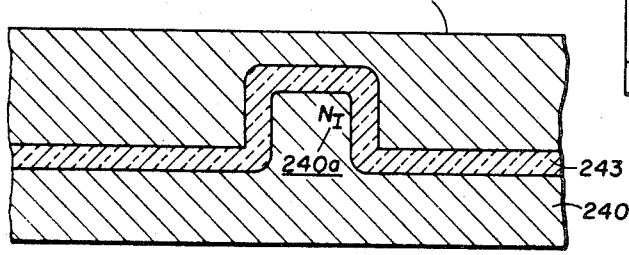
FIGURE 9 illustrates preliminary steps in forming the diode of FIGURE 7.
Figure 10:
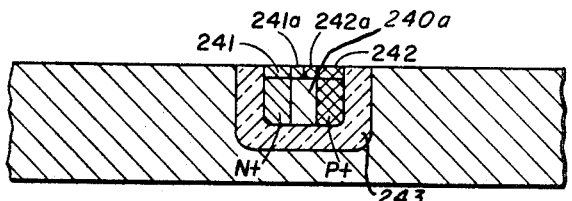
FIGURE 10 illustrates further processing steps in forming the diode of FIGURE 7.
Figure 11:
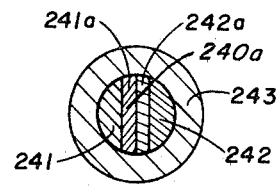
FIGURE 11 is a top view of the diode structure of FIGURE 10.

Referring again to FIGURE 7, a diffused, surface-oriented diode with insulation isolation represents a preferred embodiment of the invention. One procedure for forming this structure is shown in FIGURES 9–11. The structure illustrated in FIGURES 9–11 is similar to the structure illustrated in FIGURE 7, and corresponding parts will therefore be designated by corresponding reference numerals. However, the structure of FIGURES 9–11 is illustrated as round, while the structure of FIGURE 7 is rectangular. The surface of a single crystal, high-resistivity substrate of N-type material is etched on the surface to form a mesa 240a on the top surface. The oxide layer 243 is then grown over the upper surface of the etched wafer and over the mesa 240a to form an insulating layer over the entire etched surface. The material forming the bulk substrate 210 of the structure in FIGURE 7 is then deposited or grown over the top of the slice 240 to completely cover the insulation layer 243 and to surround the insulation covered mesa. After the bulk material 210 is grown onto the top of the wafer, the top (in FIGURE 9) of the bulk material 210 is lapped smooth for receiving the ground plane conducting layer 230 shown in FIGURE 7.

The substrate 240 is then lapped so that all of the original wafer is removed except for the mesa which is then the island 240a located in a well or depression surrounded by the isolation layer of silicon oxide 243 as shown in FIGURE 10. Thereafter as shown in FIGURE 11, through a photomasking technique, N+ and P+ diffusions are made to form the zones 241 and 242 of opposite-conductivity types in the island 240a. Inside the island there is then high enough impurity concentration for good low resistivity ohmic contact. The low resistivity (high concentration) diffusions have a very narrow intrinsic zone between them, of the order of 0.3 mil wide. Into this area of original material, there are made two very shallow diffusions 241a and 242a of N and P-type materials, respectively. The diffusions are very shallow (3 lines or 3 x 0.016 mil) with high concentrations. The junction between the N and P shallow diffusion zones 241a and 242a is not or need not be accurately positioned as long as it is within the 0.3 mil strip. The junction between the two zones is 1 mil wide and 3 lines deep or an area of 1 x 3 x 0.016 mil=0.048 sq. mil. This results in a very low capacitance junction suitable for use in the mixer of FIGURE 5. Contacts are readily applied to the two N+ and P+ regions of FIGURES 10 and 11 to be used for bonding or pressure contacts alloyed in.

Where the diode is to be employed in the mixer application, the separation 248, FIGURE 7, between the junctions will be reduced to zero. The boundaries of the two zones will thus be contiguous. Surface-oriented diodes for use in switching applications will be constructed with separation between the two zones and for high current capability, will be interdigitated as shown in FIGURE 8.

In FIGURE 7, transmission lines 245 and 246 extend along the top of the insulating layer 244 to contact with the zones 241 and 242 respectively. Preferably, the transmission line leading to and from the surface-oriented diode, expect for the insulation over the junctions as shown in FIGURE 7, will be formed directly on the surface of the semiconductor material 210. Preferably, ground plane conductor 230 and the low resistance conductive strips 245 and 246 are gold and overlay an extremely thin film of a metal such as molybdenum, as above noted, or of vanadium, platinum, nickel or tungsten evaporated to a thickness of a few microns to form an underlayer for each strip. The underlayer having a high eutectic temperature will prevent the formation of lossy zones that would otherwise be present where gold strips to be formed directly onto the silicon surface and then subjected to treatment at temperatures wherein th silicon would become intermixed with the gold at the boundary thereof. The ground plane layer 230 is shown as having been formed over such an underlayer 249 on the bottom surface of the structure as shown in FIGURE 7.

Thus, for switching use, the diode junctions are spaced apart to form a PIN diode junction. For mixer use, the confronting portions of the junctions are contiguous or overlap to form a PN diode junction. In the latter case, the boundary of the last diffused zone would define the diode junction.

Figure 12:
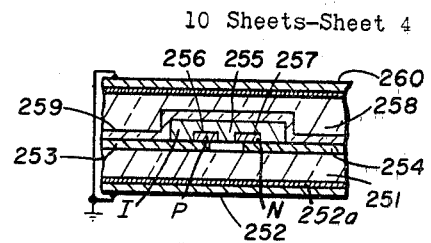
FIGURE 12 is a modified mixer construction employing a surface-oriented diode wafer and ceramic substrate.

In FIGURES 6–11, surface-oriented diodes are formed in a semiconductor substrate and thus involve a single basic building material. In FIGURE 12, a modified form of mixer construction has been illustrated. In this embodiment, a relatively thick high dielectric ceramic layer 251 has a ground plane conductive layer 252 on the bottom face thereof with a thin high eutectic metallic layer 252a thereunder. The strip-line conductors 253 and 254 are formed on the upper face of the ceramic substrate 251. A surface-oriented diode 255 having diffused P and N-type zones 256 and 257 respectively formed therein is then employed in a sandwich construction to form a diode which corresponds with the diode 222 of FIGURE 5. The diode 255 is formed in a thin wafer or chip of semiconductor material and then placed face down onto the ends of the strip-line conductors 253 and 254. An isolated insulation layer 259 is then formed over the top of the ceramic substrate 251 to encompass the diode 255. A glass evaporate layer 258 is then deposited on top of the insulated layer 259. A high eutectic metal layer with a ground plane surface conductive layer 260 is then formed on top of the layer 258. A conductor serves to connect the ground plane layers 252 and 260 together for forming a shielded sandwich construction for the mixer transmission line elements and the surface-oriented diode.

*Frequency multiplier*

Figure 13:
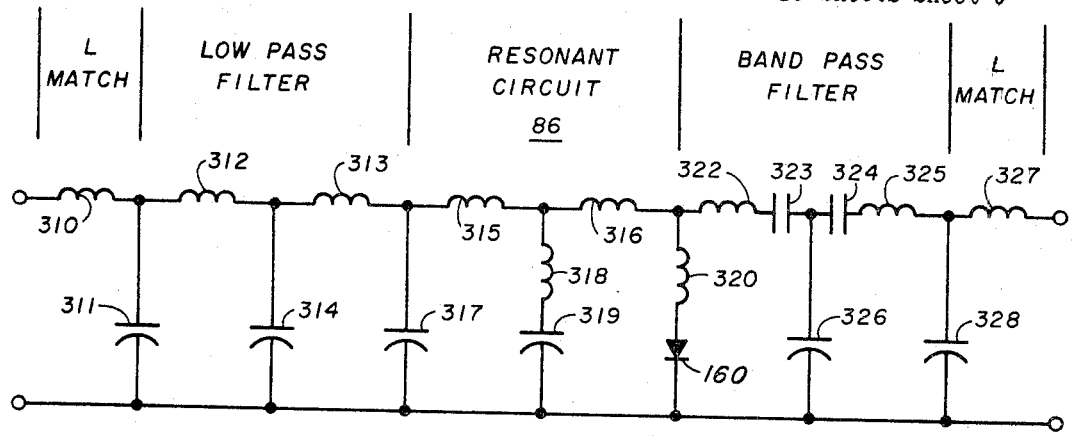
FIGURE 13 is a lumped constant diagram of the multiplier circuit of FIGURE 4.

The frequency multiplier 86 of FIGURE 4 has been further illustrated in a lumped constant equivalent form in FIGURE 13. The L matching section includes a series inductance 310 and a shunt capacitance 311. A low pass filter comprised of series inductances 312 and 313 and shunt capacitance 314 provides a low pass filter tuned to 2.25 gc. The resonant circuit which includes the active element is comprised of series inductances 315 and 316. A shunt capacitance 317 is connected to the juncture between inductances 313 and 315. A series resonant shunt circuit comprised of inductance 318 and capacitance 319 is connected to the juncture between inductances 315 and 316. A shunt circuit comprised of an inductance 320 and a diode 160 is connected to the juncture between inductance 316 and the series inductance 322 forming a part of the output band pass filter. The band pass filter includes series inductance 322, capacitance 323, capacitance 324, and series inductance 325. Shunt capacitance 326 is connected to the juncture between capacitances 323 and 324. The output L matching section includes series inductance 327 and a shunt capacitance 328.

Figure 14:
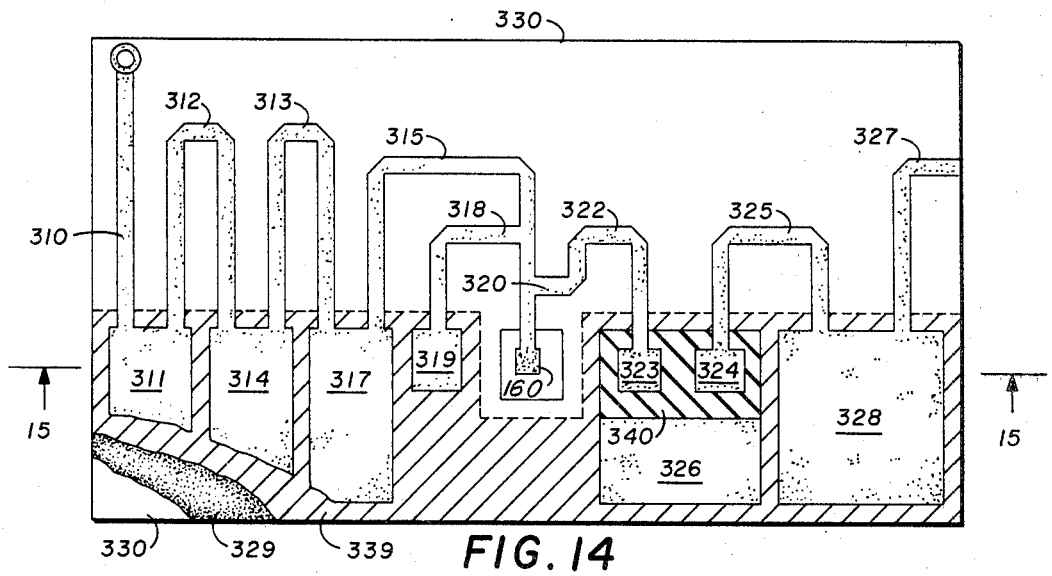
FIGURE 14 is a top view of an integrated circuit embodiment of the multiplier of FIGURE 13.
Figure 15:
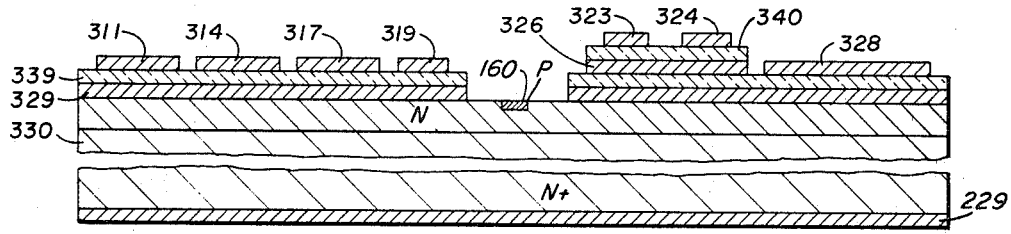
FIGURE 15 is a sectional view taken along lines 15—15 of FIGURE 14.

The formation of the multiplier in one integrated circuit configuration is shown in FIGURES 14 and 15. Prior art systems generally are limited as to power level at frequencies such as encountered in the X-band because of the small geometry necessary for operation. For example, over 25 watts power output is available from a single transistor at frequencies as high as 100 mc. For amplifiers utilizing one transistor per stage at 1000 mc., about 200 milliwatts are available and at 3000 mc., this is reduced to about 10 milliwatts. The large power capabilities at lower frequencies and efficient frequency multiplication are combined in the system shown in FIGURES 14 and 15 to obtain the necessary power at high frequencies. By this means, peak power output capability of integrated microwave sources of about 1 watt can be obtained at frequencies well above 8 gc.

The multiplier shown in FIGURES 14 and 15 employs a varactor diode 160 operating as a quadrupler with idlers at second and third harmonics. More particularly, thhe tuned circuit 318 and 319 may be considered to be resonant at the second harmonic and the tuned circuit 320 and 160 at the third harmonic. Because of integrated circuit construction, rather than lumped constant construction, there is contribution to the several resonance conditions from most or all of the elements in the unit since isolation of any one element is not possible as in lumped constant circuit construction. Therefore the description as to resonant circuits is in terms of result with a construction shown in FIGURE 14. The circuit will change the frequency from an input frequency of 2.25 gc. to an output frequency of 9 gc.

As shown in FIGURES 14 and 15, the varactor diode and the strip-line transmission circuits forming inductance and capacitance are formed on a semiconductor substrate. The substrate 330 has about one-half of its area covered by a highly conductive surface layer 329. The layer 329 is then covered by a thin dielectric layer 339 so that layer 329 serves as a common plate for all but two condensers in the multiplier.

The input L section is formed by the strip transmission line 310 which extends over the thick dielectric portion of the substrate 330 to the plate 311 of the input capacitor. The capacitor 311 overlays the relatively thin dielectric layer 339 to form a condenser with the common conductive layer 329. The loop 312 forms an inductance over the thick dielectric layer and leads to a capacitor plate 314 over the thin dielectric layer. Similarly the loop 313 leads to the capacitor plate 317. The transmission line filter system will thus be characterized by long thin transmission lines over thick dielectric sections to provide primarily inductance characteristics. Wide transmission line sections overlying thin high dielectric layers form zones in the transmission line system primarily capacitive in nature. The loop 315 extends from plate 317 over the thick dielectric to the juncture with a loop 318 which leads to a capacitor plate 319. Loop 315 also leads to one terminal of the varactor diode 321. A strip extending from the juncture 320 and loop 322 then leads to a capacitor plate 323. The capacitor plate 323 is positioned on top of a conductive layer 340 which overlays one-half of the condenser plate 326. Condenser plate 324 similarly overlays the plate 326. The transmission line loop 325 then extends to the output capacitance plate 328 with the matching inductance 327 extending from the plate 328. The plate 326 is capacitively coupled to the capacitor plates 323 and 324 and to the high conductive layer 329.

For frequencies within the range of from 0.5 to 5 gc., input and output impedance will be on the order of from 10 to 50 ohms. Capacitance values will be within the range of from 5 to 75 picofarads (*pf.*) ($10^{-12}$ farads) and inductances between 0.5 and 10 nanohenries (nh.) ($10^{-9}$ henries).

Since relatively high Q capacitances are necessary for operation of the multiplier circuit, an extremely thin, high dielectric constant layer 339 is employed. The inductances have low loss and high effective inductance per unit length. Thus, in the planar construction of FIGURES 14 and 15 large spacing between thin conductive loops on the upper surface of the slice 330 and the ground plane conductor form inductances. In addition, the wide conductive layers 339 and 340 over a thin high dielectric layer form capacitances. Preferably the substrate 330 will have a dielectric constant of the order of from 4 to 12 and a thickness of from 0.005 to 0.010 inches. The layers 339 and 340 will have a dielectric constant of about 40 to 50 and a thickness of 0.0001 inch.

The filters at the input and output of the multiplier form traps to prevent power flow from the multiplier other than at the desired frequency. At the same time, the dissipation of power in the varactor is held at a minimum while maintaining the necessary band width of the multiplier. A significant band width is required due to both the characteristics inherent in the operation of the non-linear reactance or diode 160, and the undesired variations in temperature of the semiconductor junction capacitance. The multiplier band width must be sufficient to allow buildup of voltage amplitude across the diode junction, and thus develop bias voltage to bring the multiplier into proper operating range.

The dielectric requirements for both the capacitors and inductors thus may be fulfilled on the common substrate or slice 330. Diode fabrication techniques indicated in FIGURE 16 may be followed.

In step (a), N-type material is epitaxially deposited onto an N+ gallium arsenide slice. After the slice is polished, a thin film of silicon dioxide is reactively sputtered onto the surface to a thickness of approximately 6000 angstroms. The wafer 330 with the N-type epitaxial layer 331 and the silicon dioxide surface layer 332 are shown in step (a).

By a photomasking technique, a hole 333 is then cut in the layer 332 as shown in step (b). The slice is then sealed in a quartz ampoule with $ZnAs_2$ and is diffused for about two minutes at 900° C. The result is shown in step (c) with the diffusion of zinc 334 through the hole 333 being accomplished. The depth of the diffusion is of the order of about 0.3 mils. In addition to the diffusion through the hole 333, the zinc also diffuses through the layer 332 to form a thin P layer under the oxide. The oxide layer is then removed as shown in step (d). As shown in step (e), the slice is treated with a sulphuric acid etch to remove the thin P layer outside the regions defined by the hole 333. At this point, a new oxide layer 335 is sputtered onto the slice as indicated in step (f). By photomasking and selectively etching, the oxide layer 335 is removed over the zone occupied by the zinc diffusion 334, as indicated in step (g). A transmission line strip is then evaporated onto the slice and alloyed with the gallium arsenide to form the contact 336, as shown in step (h).

After the formation of the varactor junction, the upper half of the wafer 330 is masked and a conductor is alloyed to the lower unmasked portion to form layer 329. The masking is then removed and a 1 mil thick dielectric is deposited to form layer 339. Upon this substrate, conductors shown in FIGURE 14 are incorporated by photolithographic masking techniques. Gallium arsenide and intrinsic silicon are preferred as substrate materials. A yttrium-iron-garnet substrate may be employed for the multiplier network. Gold may be employed on silicon and aluminum on gallium arsenide as the conductive materials.

Figure 17:
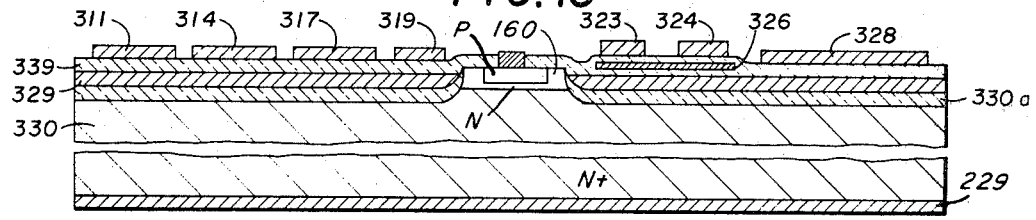
FIGURE 17 is an sectional view of a multiplier in which a mesa diode is employed.

While a planar construction is shown in FIGURE 15, it will be recognized that other modes of fabrication may be employed for providing the multiplier network on the semiconductor substrate. In FIGURE 17 a mesa-type construction is shown in which a mesa is first formed on the substrate 330 to provide a site for the diode 160. An insulating layer 330a is then formed on the surface of the substrate 330 extending up along the slopes of the mesa for insulating the junction therein.

Thereafter, the conductive layer 329 will be formed over a portion of the surface of the substrate for forming the common plate for condensers 311, 314, 317, 319, 326 and 328. The thin layer 339 of high dielectric material is then formed over the conductive layer 329. Thereafter, the condenser plates and the strip line loops will be incorporated in the circuit configuration shown in FIGURE 14.

Figure 18:
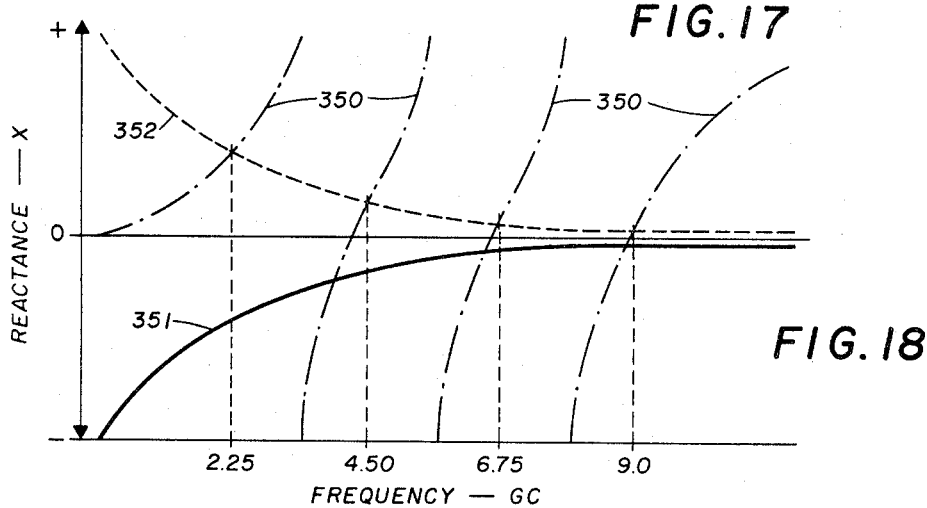
FIGURE 18 is a reactance vs. frequency diagram for the multiplier circuit.

The parameters in the construction illustrated in FIGURES 14–17, in general, are distributed constants. Resonances will be present within the system, such as illustrated in the graph shown in FIGURE 18. Reactances in the resonant circuits are plotted as a function of frequency. The impedance of the circuit, as viewed from the terminals of the varactor 160, is illustrated by the dotted lines 350. The reactance of the varactor diode 160 is plotted as the solid curve 351. The dotted curve 352 is the reciprocal of curve 351.

Figure 16:
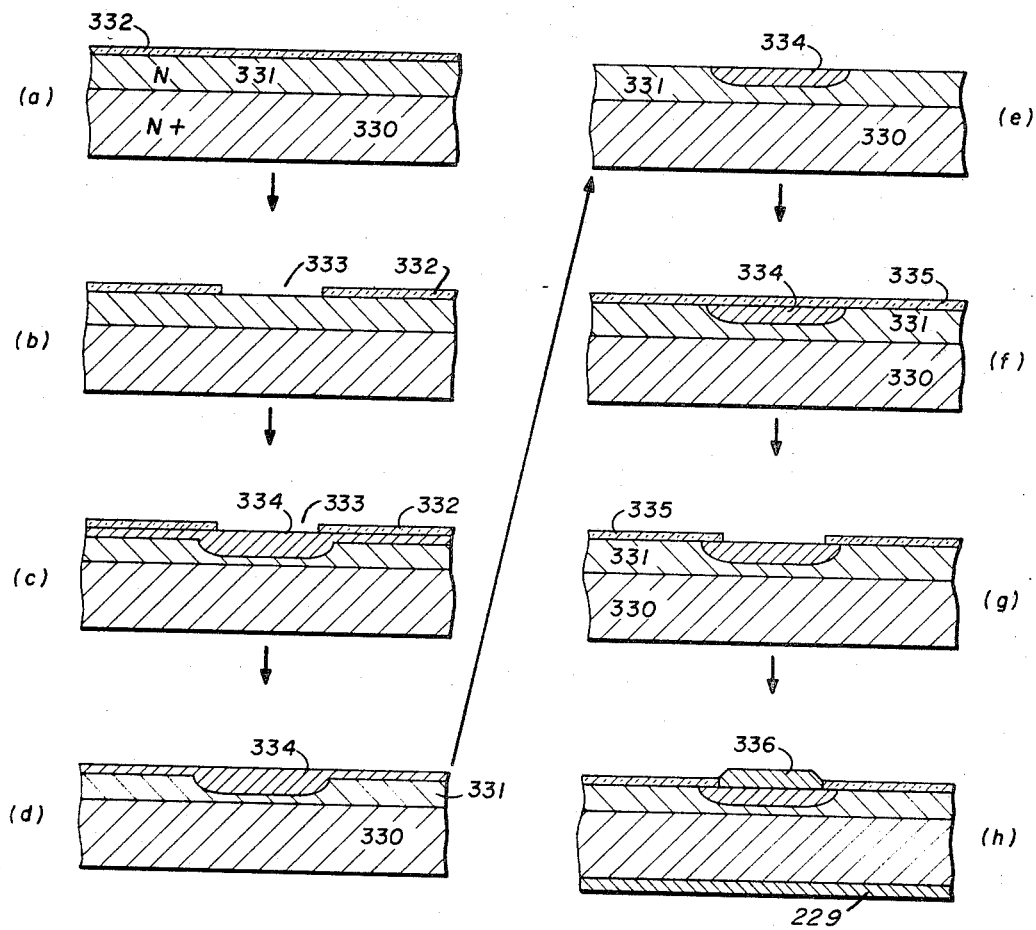
FIGURE 16 is an enlarged view of the fabrication sequence of the diode of FIGURE 14 in planar form.

The circuit construction of FIGURE 14, as further detailed in FIGURES 15–17, operates such that the intersection of the reciprocal curve 352 and the reactance curve 351 occurs at the input frequency of 2.25 gc. and at the harmonic frequencies of 4.50, 6.75 and 9.0 gc., respectively.

Figure 19:
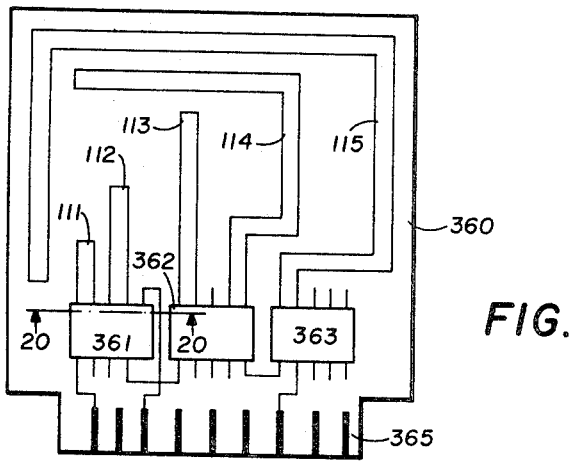
FIGURE 19 illustrates a phase shift delay strip-line panel.

While FIGURE 1 illustrates an array of integrated circuits in the antenna module 14, one form of construction of the phase shift delay line is shown in FIGURE 19. The delay line plate 360 has three integrated circuit modules 361, 362, and 363 mounted thereon. Such a wafer may be included in the package shown in FIGURE 2.

The first module 361 may include the switches SW1 and SW2 of FIGURE 4. The module 362 will include the switches SW3 and SW4 and the module 363 will include switches SW5 and SW6. The delay lines 111–115 are formed on the plate 360 with the line length being progressively longer as by factors of 2, from one line to another. Plate 360 is provided with input transmission line terminals on the tab 365 for transmission to and from the plate 360 of the phase control carrier and the received signal voltages as well as the clock pulses.

With integrated circuits 361–363 of form illustrated, the wafer 360 may be relatively small with maximum dimensions of the order of about an inch.

Figure 20:
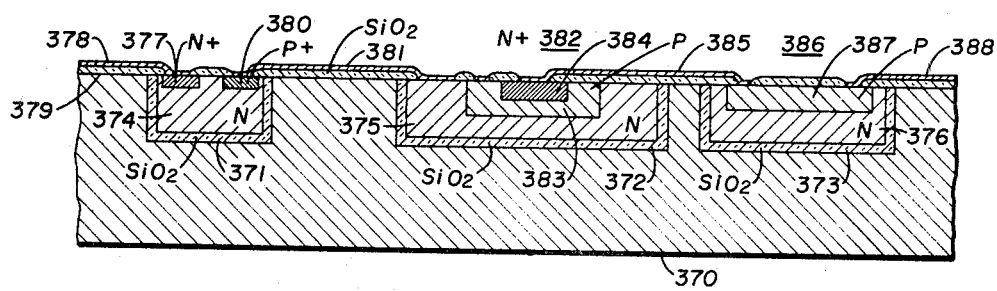
FIGURE 20 is a sectional view of the integrated circuit of one unit of FIGURE 19 taken along lines 20—20.

FIGURE 20 is illustrative of the construction of the integrated circuit wafer for the switching networks. The substrate 370 is of polycrystalline silicon. Insulation isolation cups 371, 372, and 373 surround and isolate islands 374, 375, and 376 of N-type material. The surface-oriented diode formed in the island 374 may be of the type illustrated in FIGURE 7 and will serve as either the transmit diode 122 or the receive diode 123 of FIGURE 4. A diffused N+ zone 377 is connected to a strip conductor 378 which is formed over a surface insulation layer 379. A diffused P+ zone 380 is then connected by conductor 381 to the emitter terminal of transistor 382.

A transistor 382 is formed of the N zone 375, P zone 383, and N+ collector zone 384. A conductor 385 connects the collector of the transistor 382 to a resistor 386, the resistor being formed by a P-type diffusion zone 387 in the N-type island 376. Lead 388 is connected to the resistor 386 and extends to other circuit elements.

With construction of the type illustrated in FIGURES 19 and 20, the phase shift delay lines and the control networks in integrated circuit form may be included in module 14. At some frequencies and for some applications, it will be desirable to construct phase shift modules separate from the radiation module 14. Such phase shift modules may be formed as shown in FIGURE 19 and would be connected in the antenna circuit between the manifold 40 and the radiation module 14.

IF preamplifier

The IF preamplifier of FIGURE 4 is of integrated circuit construction and has a gain of about 50 db. Such high-gain integrated circuit amplifiers operating at frequencies in the range from 200 mc. to the low gc.'s, are subject to oscillation as a result of electromagnetically-coupled feedback within the integrated circuit package. This is primarily due to the very close spacing between the active and passive components formed integral with the semiconductor substrate.

Figure 21:
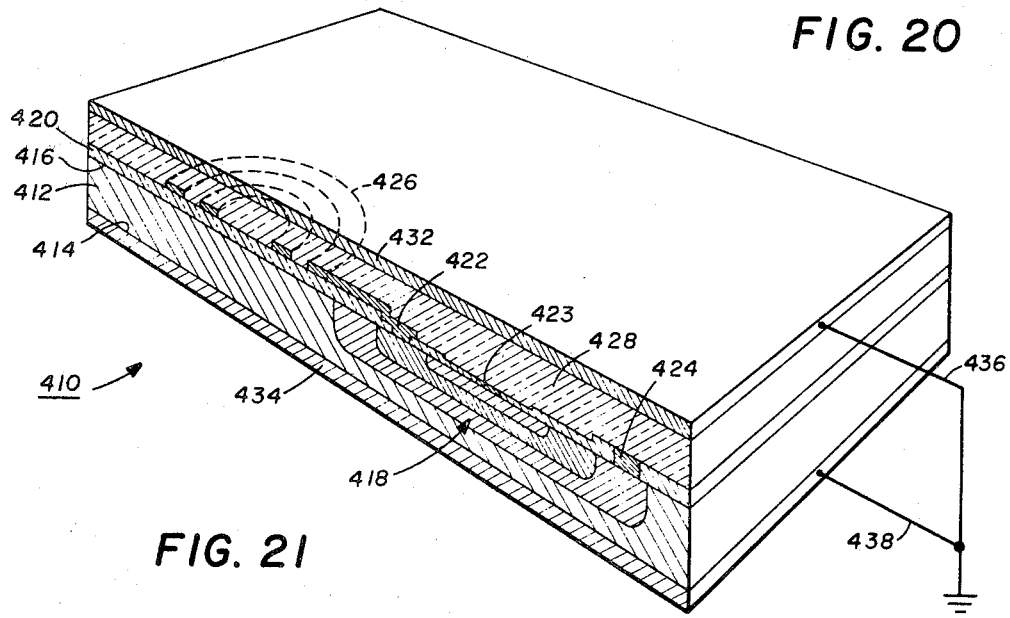
FIGURE 21 illustrates video amplifier construction for the IF preamplifier of FIGURE 4.

FIGURE 21 illustrates an integrated circuit 410 of construction suitable for the IF amplifier 89 of FIGURE 4. The circuit 410 is comprised of a substrate 412 of single crystal, high resistivity silicon or other semi-insulating or high-resistance semiconductor material having first and second surfaces 414 and 416. The resistance required between the surfaces 414 and 416 will vary with the frequency at which the circuit is operated, the lower the frequency the greater the resistance required. However, for higher frequency applications, high resistivity semiconductor material is adequate. The components for the IF amplifier are formed at the surface of the semiconductor substrate 412 using any conventional technique. For example, a transistor 418 may be formed in the surface by sequentially diffusing N-type, P-type and N-type regions into the surface 416 of the substrate through openings etched in an oxide film 420. Alternatively the components may be formed on the surface of the substrate by epitaxial techniques. The circuit may also include interconnecting strip conductors such as 422, 423 and 424 which may be placed directly on the high resistivity substrate 412 or on the oxide film 420. The conductors may also form inductors such as indicated by the dotted outline at 426.

An insulating layer 428 is deposited over and adherently bonded to the portion of the second surface of the substrate 412 which is exposed and to the components of the circuit and is therefore integral with the substrate. Metalized films 432 and 434 are adherently bonded to the insulating layer 428 and to the first side 414 of the substrate. When the metalized films 432 and 434 are connected to ground, as represented by the conductors 436 and 438, the entire integrated circuit is disposed between two closely-spaced ground planes. As a result of the closely spaced ground planes, the electromagnetic radiation from any particular component is attenuated by a loss factor of $$\text{Loss} = k\left(\frac{d}{2s}\right) \text{ db}$$

wherein $k$ is dependent upon the dielectric constant of the material between the components and the respective ground planes, $d$ is the distance from the point at which the electromagnetic wave is generated, and $s$ is the spacing between the ground planes. Although the attenuation increases as the spacing between the ground plane decreases, the insulating layer 428 should be at least 1.0 mil thick and is preferably from 3–5 mils in thickness. It will be desirable to envelope the entire circuit structure, including the substrate and insulating layer, in the metalized ground plane.

In FIGURE 21 the insulating layer 428 is glass. The glass is selected so as to have a coefficient of thermal expansion closely matching that of the substrate so as to provide thermal-mechanical stability. Further, for stabilizing the high-frequency transmission lines, the insulating layer 428 is preferably about the same thickness as the substrate 412 so that the dielectric constant between the circuit components and each of the ground planes will be approximately equal. However, the insulating layer 428 may be any material which may be adherently bonded to the substrate 412, which is chemically compatible with the substrate and active components at various temperatures, and which has a thermal coefficient of expansion compatible with that of the substrate 412 so that the substrate will not be placed under stress due to temperature changes, and may be of any desired thickness, usually thin for amplifier application and relatively thick for transmission line application. The dielectric constant may be very closely matched by making the insulating layer 428 from high-resistivity semiconductor material of the same type as the substrate 412. This can be accomplished by epitaxial growth, if a single crystal is desired for part of an active component, or by another process where a polycrystalline structure will suffice. The substrate 412 should be relatively thin, for amplifier applications where it is desired to place the ground planes as close to the active components as practical, and will usually be less than about ten mils in thickness.

As an alternate structure, the substrate 412 may be a doped semiconductor material rather than intrinsic silicon or semi-insulating semiconductor material. In such case an insulating layer is provided between the metalized film 434 and the substrate so that the ground plane formed by the film 434 will be electrically insulated from the components of the circuit. Such an insulating layer may be any suitable material such as silicon dioxide, aluminum trioxide, glass, or the like, but is preferably glass. The device 410 is particularly suited for lower frequency applications where the dielectric constant should be higher.

An IF amplifier or the like is fabricated on and in the surface of the substrate 412 using any conventional technique as heretofore described. Then the glass insulating layer 428 is formed by applying a liquid in which a high concentration of very fine glass particles is suspended. The glass particles are allowed to settle from the liquid and deposit as a sediment on the surface of the substrate and over the components of the circuit. The sedimentation process tends to uniformly deposit the glass particles over the components of the circuit and produce an essentially planar surface. Then the substrate is heated to a temperature sufficiently high to fuse the glass particles into a solid mass which adherently bonds to the exposed portion of the substrate; the oxide insulating film 420, if any, or the components of the circuit, as the case may be.

Although the insulating layer 428 was identified as glass applied by means of the liquid suspension technique, the insulating layer 428 may also be formed from glass or quartz which is evaporated in a high vacuum and condensed on the surface of the substrate. The metallized films 432 and 434 may then be deposited by a conventional evaporation and condensation process.

The exposed surfaces of the substrate and insulating films are then metalized, preferably by evaporating and condensing a metal onto the surfaces, or by other well-known techniques. Gold, aluminum or other suitable metal may be used for this purpose. However, if gold is to be deposited directly on a silicon substrate, a thin layer, a few angstroms thick, of molybdenum or other metal which does not dope the silicon is preferably deposited on the surface 414 before the gold is deposited to prevent doping of the silicon by the gold.

The integrated amplifier circuit is disposed between a pair of closely-spaced ground planes. The ground planes and the circuit are interconnected so as to provide a rugged, sealed package. For high frequency transmission lines, the dielectric properties between the circuit components and each of the ground planes may be made approximately equal for improved performance.

Beam steering reference voltage generation

Figure 23:
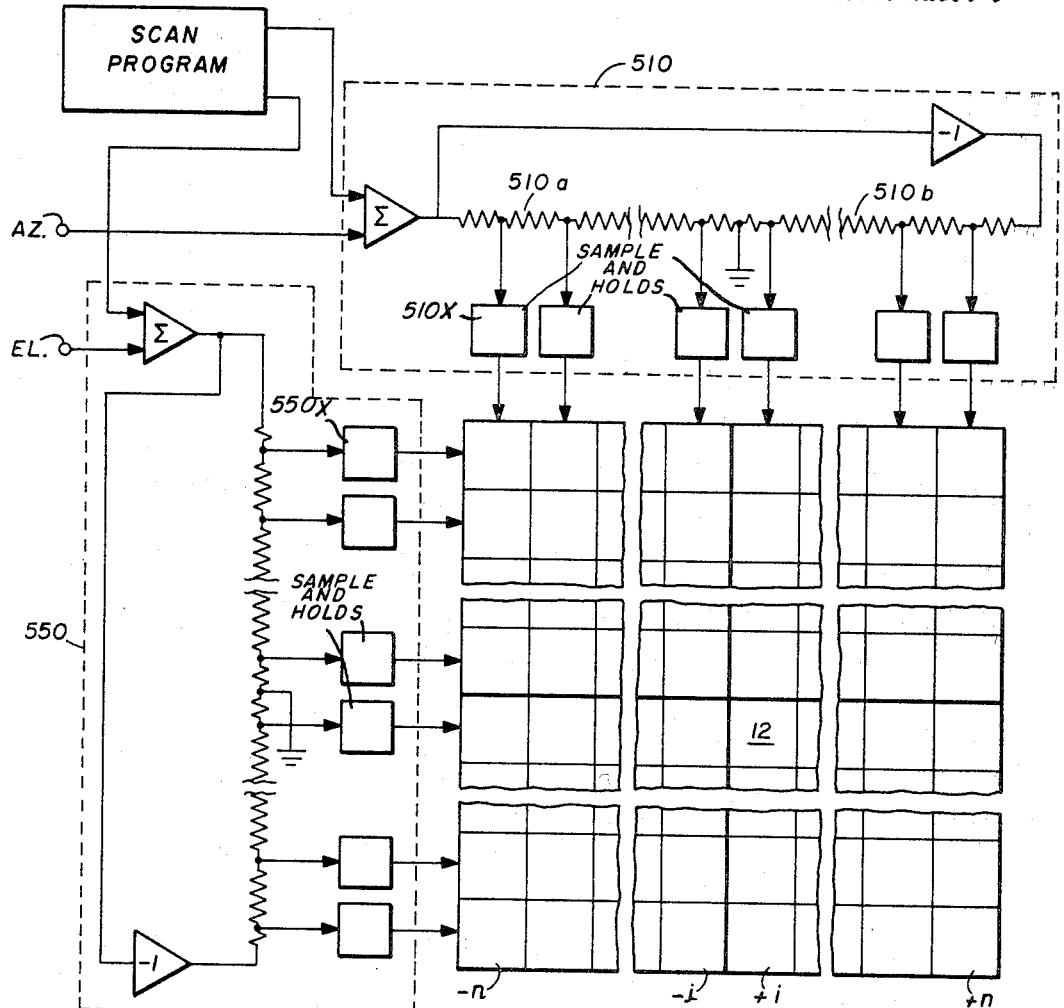
FIGURE 23 is a schematic diagram illustrating distribution of reference voltages to the antenna modules.
Figure 22:
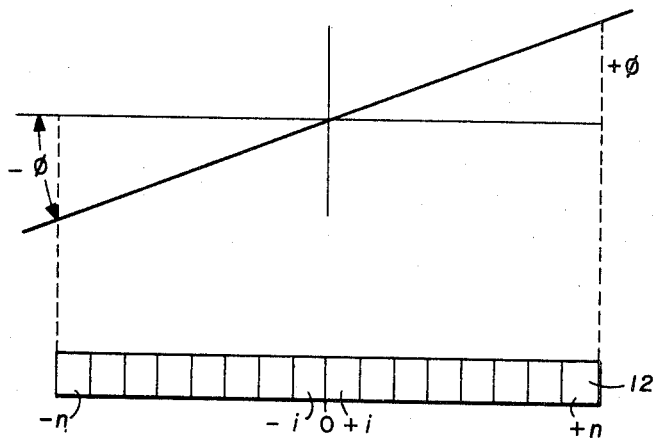
FIGURE 22 is a top view of antenna 12 illustrating beam-scanning.

The present invention is directed to a control system for generating families of reference voltages such as the voltage applied to terminal 35, FIGURE 4, in each module.

Where the antenna is made up of an array of elements arranged in rows and columns as shown in FIGURE 23, each of the rows and columns may be numbered for convenience according to their position in the array. To shift the beam of the antenna in a horizontal direction through an angle φ, FIGURE 22, the phase of the RF energy applied to the radiation structure in each module in each column must be shifted by an amount which is proportional to the angle φ, the angle that the beam is to be shifted from a line perpendicular from the face of the antenna. The phase shift for each module must also be dependent upon the location of the module in the array. FIGURE 22 shows a top view of the antenna unit 12 and a plot of the phase shift versus distance from the center of the antenna.

As shown in FIGURE 23, the control unit 510 generates a reference voltage which shifts the plase for the column −n at the left edge of antenna 12 through the same phase angle. As represented by the tapped resistor 510a in unit 510, the voltages applied by way of sample and hold units 510x to the columns of the antenna. Sample and hold units 550x apply voltages to the row of antenna modules. Voltages are applied to the columns in the right antenna half are the same for each column but are graded from a maximum at the edge column to near zero at the center column. The left antenna half columns similarly are controlled by reference voltages such as might be derived from resistor 510b. The unit 550 similarly serves to control the vertical scan or beam position. To point the beam in a direction involving both the horizontal and vertical deflection, the reference voltage for a given antenna element is the sum of the voltage required for the column in which a given element is positioned and the voltage required for the row in which the given element is located. Thus, as illlustrated in FIGURE 22, the column at the left side of the antenna unit 12 would be delayed by an angle −φ. The column at the right edge of the antenna unit 12 would be delayed by an angle of +φ.

Where the antenna array is one wavelength wide and where the difference between the angle −φ and +φ is 360°, the antenna radiation primarily will be at 45° to the face of the antenna. In practice, however, the antenna generally is made many wavelengths wide as well as high so that narrow beams may be produced. When this is done, it is necessary to produce phase shifts across the face of the antenna which are equal to N 360°. The factor N may be any integral number with practical values ranging as high as 10 to 15 or more for phase shifts of around 5000° across the antenna.

Figure 24:
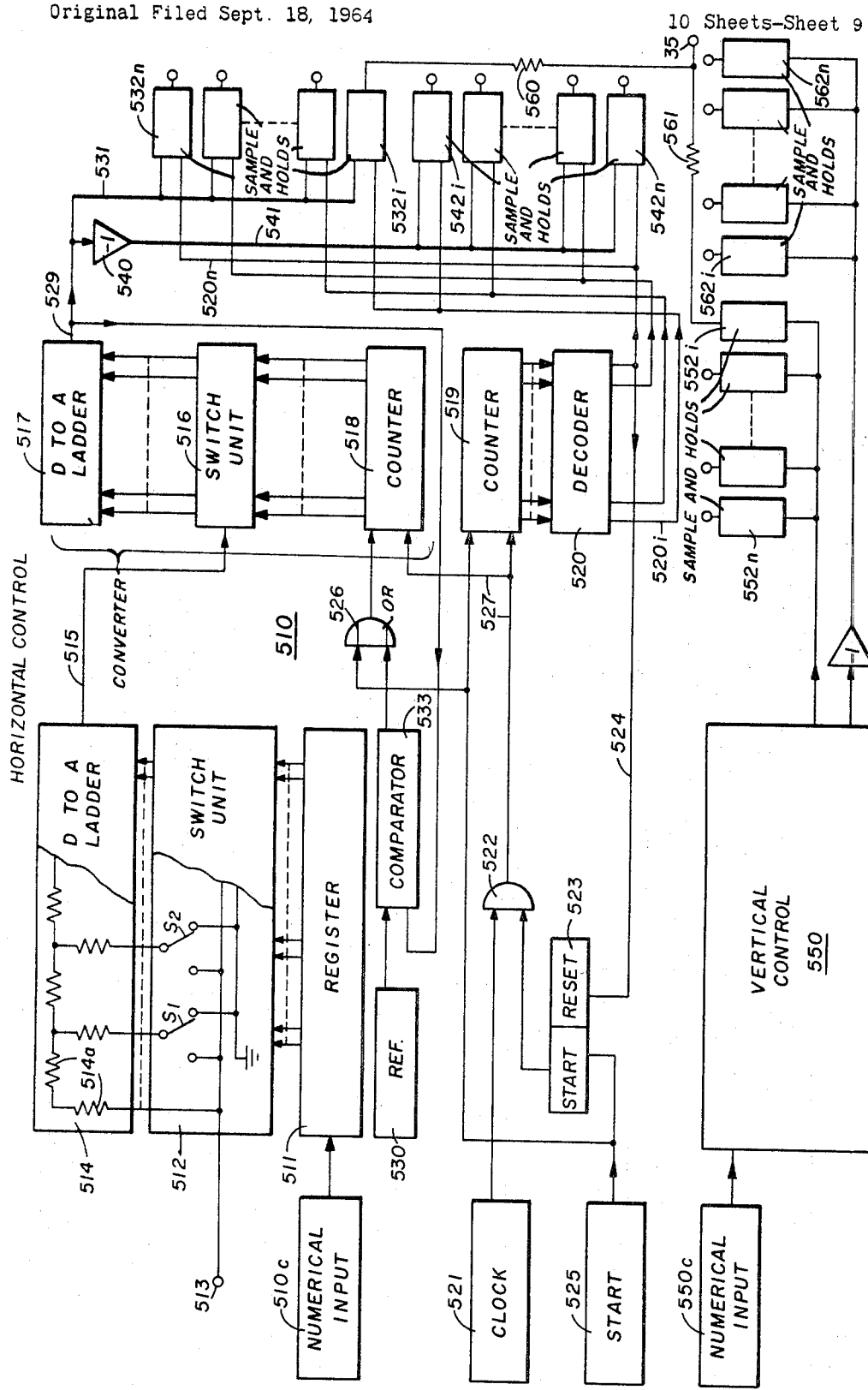
FIGURE 24 illustrates generation of reference voltages for the antenna modules.

In FIGURE 24 the controller for generating the horizontal and vertical reference voltages above noted is shown, with the controller for producing the horizontal reference voltages being shown in detail.

In order to point the beam in a given direction, a binary number, proportional to the phase shift required for the edge column n, FIGURE 22, is read into an input register 511 of unit 510 from a control source 510c. The register 511 is connected to a switch unit 512. A reference voltage is applied to the switch 512 by way of input channel 513. The digital-to-analog converter of FIGURE 24, may include switch unit 512 which, may be the same as in FIGURE 4 which shows the construction on the switch units SW1–SW6 and the connections to the ladder network. The register 511 may be composed of flip-flops as shown in FIGURE 4 or may comprise other binary storage elements. These elements control switches in unit 512 which in turn control the binary weighted resistance ladder of the type commonly used in digital-to-analog converters. Typical of the construction is the resistance network illustrated in the unit 514. The resistance values are chosen so that the voltage at the output is ½k the value of the reference voltage on terminal 513 and k is the number of switches in the ladder. When switch S2 is closed to the reference voltage and all the other switches are connected to ground, the output voltage is ½k−1 times the reference voltage, etc. This assumes that the series resistances 514a are not present. Resistances 514a, however, are included for the purpose which will later be explained. In operation the switch for each given ladder position is connected to the reference voltage if the bit in the corresponding register is 1, and to ground if the bit is 0.

The output of the ladder network 514 is applied by way of conductor 515 to a second digital-to-analog unit including switch unit 516 which controls a ladder network 517 and which is turn in controlled by a counter 518. A second counter 519 counts in parallel with counter 518. A decoding logic network 520 is connected to counter 519. Counters 518 and 519 are controlled by a clock 521 which is connected thereto by way of an AND gate 522 and line 527. A control multivibrator 523 controls one input of the AND gate 522. The decoding logic network 520 has output lines $i$ to $n$ with output lines $n$ being connected by way of line 524 to the reset terminal of the multivibrator 523.

A starting unit 525 is connected to the start terminal of the multivibrator 523. The starting unit 525 is also connected to the reset terminal of counter 519 and, by way of and OR gate 526, to the reset terminal of the counter 518.

One control terminal of the OR gate 526 is connected to the output of a comparator 533 which is connected at one input to the output line 529 of the ladder network 517 and at the other input to a comparison reference voltage source 530. The comparator 533 produces an output signal whenever the reference voltage 530 is less than the voltage on line 529.

The line 529 is also connected to a bus 531 at the input of a plurality of sample-and-hold units 532$i$–532$n$. Line 529 is connected by way of an inverting unit 540 to a bus 541 to sample-and-hold units 542$i$–542$n$.

The voltages appearing at the outputs of the sample-and-hold units 532$i$–532$n$ and 542$i$–542$n$ are the voltages necessary to shift the beam from antenna unit 12 through a horizontal angle represented by the reference voltage from the numerical input unit 510c.

In a similar manner, a vertical control voltage generator 550 provides output voltages to sample-and-hold units 552$i$–552$n$ and 562$i$–562$n$ for shifting the beam from the antenna unit 12 through a vertical angle representative of the magnitude of the reference voltage applied from the reference numerical input voltage source 550c. The voltages from the sample-and-hold units may then be combined for application to the reference input terminals of each module (terminal 35 of FIGURE 4), so that each module in the antenna unit will be adjusted to shift the phase of the RF antenna excitation pulse in dependence upon the sum of the vertical and horizontal beam angles represented by the voltage on units 510c and 550c. The voltages may be combined from the sample-and-hold units in the manner known in the art, and such as described in "Introduction to Radar Systems," Skolnik, McGraw-Hill (1962), p. 312 et seq.

In operation, where a scanning sequence of the antenna is desired, the numbers to be read into the units 510 and 550 from the control sources 510c and 550c come from the sequence generators or programmers. The units 510c and 550c may comprise part of a computer if the antenna is to be pointed at some target, as would be the case in a target tracking operation. In either case the voltage output on line 529 will then be proportional to the phase shift desired in the extreme or edge columns of the antenna.

As soon as the phase shift number or signal has been read into the unit 510, a start pulse is applied to the control flip-flop 523. This pulse also resets the counters 518 and 519. As soon as the control unit 523 is set, the AND gate 522 changes state to allow the clock pulse train to pass to the counters 518 and 519. This causes the two counters to advance together. The counter 518 controls the units 516 and 517, with the reference input voltage being the voltage on line 515. As the count in the counter 518 increases, the voltage on line 529 increases in uniform steps.

In the explanation of operation of the reference generator which follows, it will first be assumed that the total phase shift across the face of the antenna is to be less than 360° Thereafter, operation for a phase shift greater than 360° will be explained.

For a phase shift less than 360°, counter 519 will count in synchronism with counter 518. The state of counter 519 is decoded to provide $n$ indications on $n$ individual output lines 520$i$–520$n$. The output voltage on line 529 for each step of counters 518 and 519 is a voltage proportional to the phase shift for each column. That is to say, the first stage of counters 518 and 519 results in a voltage proportional to the phase shift for columns $+i$ and $-i$ of FIGURE 23. The second stage of counters 518 and 519 results in a voltage for columns $+ii$ and $-ii$, and so on. It will be noted from FIGURE 22 that the phase required for column $n$ is the negative of the phase required for column $-n$.

Counters 518 and 519 initially are reset to a state of all zeros. This results in a ladder output voltage on line 529 of zero volts for the first state of the counters. If the number of columns in the antenna is an even number, as shown in FIGURES 1 and 23, a reference of zero volts would result in the phase shift introduced in columns $i$ and $-i$ always being zero. This would induce a slight discontinuity in the phase slope across the antenna. To prevent this, the ladder network 514 is provided with resistors 514$a$. These resistors offset the output of the ladder 514 by an amount equal to one-half step of the output voltage.

The lines 520$i$–520$n$, connected to the sample-and-hold units 532$i$–532$n$, are sequentially energized to cause storage of a sample voltage in each of the units as the states of the output lines leading from decoder 520 change. Similarly, the other half of the antenna is provided with reference voltages from bus 541 by way of inverter unit 540.

When the output on line 529 equals the reference voltage from source 530, as applied to the comparator 533, the counter 518 is reset. Decoder 520 serves to reset flip-flop 523 at the end of a phase control sequence thus inhibiting clock pulses to counter 519. Counter 519 is reset by the next start pulse. The voltage from reference source 530 is set at a value corresponding with just less than the voltage on line 529 required for 360° phase shift.

Thus far, it has been assumed that the total phase shift required is less than 360°. This generally is not the case and this fact is the basis for including the second counter 519. More particularly, with the output from the voltage ladder 517 fed to the comparator 533 and with the reference voltage from source 530 slightly less than the voltage necessary for a 360° phase shift, when the ladder output voltage exceeds the voltage from source 530, the counter 518 will be reset. However, with the clock pulse being applied thereto, counter 518 will repeat its cycle so long as the clock pulse train is present. In contrast, the counter 519 continues its count until the clock pulse train is stopped by disabling gate 522. In this way, the output of the ladder 517 always indicates a phase shift in the range of 0° to 360°. Counter 519 always contains the number of the columns in binary form for which the voltage being generated at that instant applies.

The sample-and-hold units may be of conventional construction involving closure of a switch in response to a given voltage state on a decoder output line, such as line 520$i$. This charges a capacitor in the sample-and-hold unit 532$i$ such that the voltage on the output line from unit 532$i$ is equal to the input voltage on bus 531 at the instant of closure of the switch. With a high impedance output buffer-amplifier in the sample-and-hold units, the charge on the condenser will remain unchanged after the input switch is opened. Switches in the sample-and-hold units are controlled by the decoded state of counter 519, as above noted. State 1 of counter 519 closes the switch in the sample-and-hold units 532$i$ and 542$i$. Since the inverter 540 is employed to feed bus 541, the two voltages are thus stored as reference voltages for two phase shift units. When the counter 519 reaches its $n$th state, a voltage for each column is stored in the 2$n$ sample-and-hold units. The decoded $n$th state of counter 519 also resets unit 523 and ends the process.

The controller 550 for the rows of antenna modules is identical to the controller 510 for the columns of antenna modules. If the rows and columns are the same in number, then the controllers are identical. If the rows and columns are not the same, then the controllers differ only in the number of states produced by the counter 519.

The phase shift reference voltage, for application to a given module, is produced by summing the voltages from two of the sample-and-hold units. This would be accomplished by means of a pair of summing resistances for each element, such as resistances 560 and 561. The output voltage from unit 552$i$ would be separately summed with each of the output voltages from the sample-and-hold units 532$i$–532$n$ and 542$i$–542$n$.

It is not necessary that the antenna be as shown in FIGURE 23. By omitting elements in the outer rows or columns, the configuration shown in FIGURE 1 may be formed. Entire rows or entire columns may be omitted, depending upon the particular application required. If only one column is employed or if only one row is employed, then either the unit 510 or the unit 550 would be employed to generate the phase control reference voltages.

*Time sequence*

Figure 25:
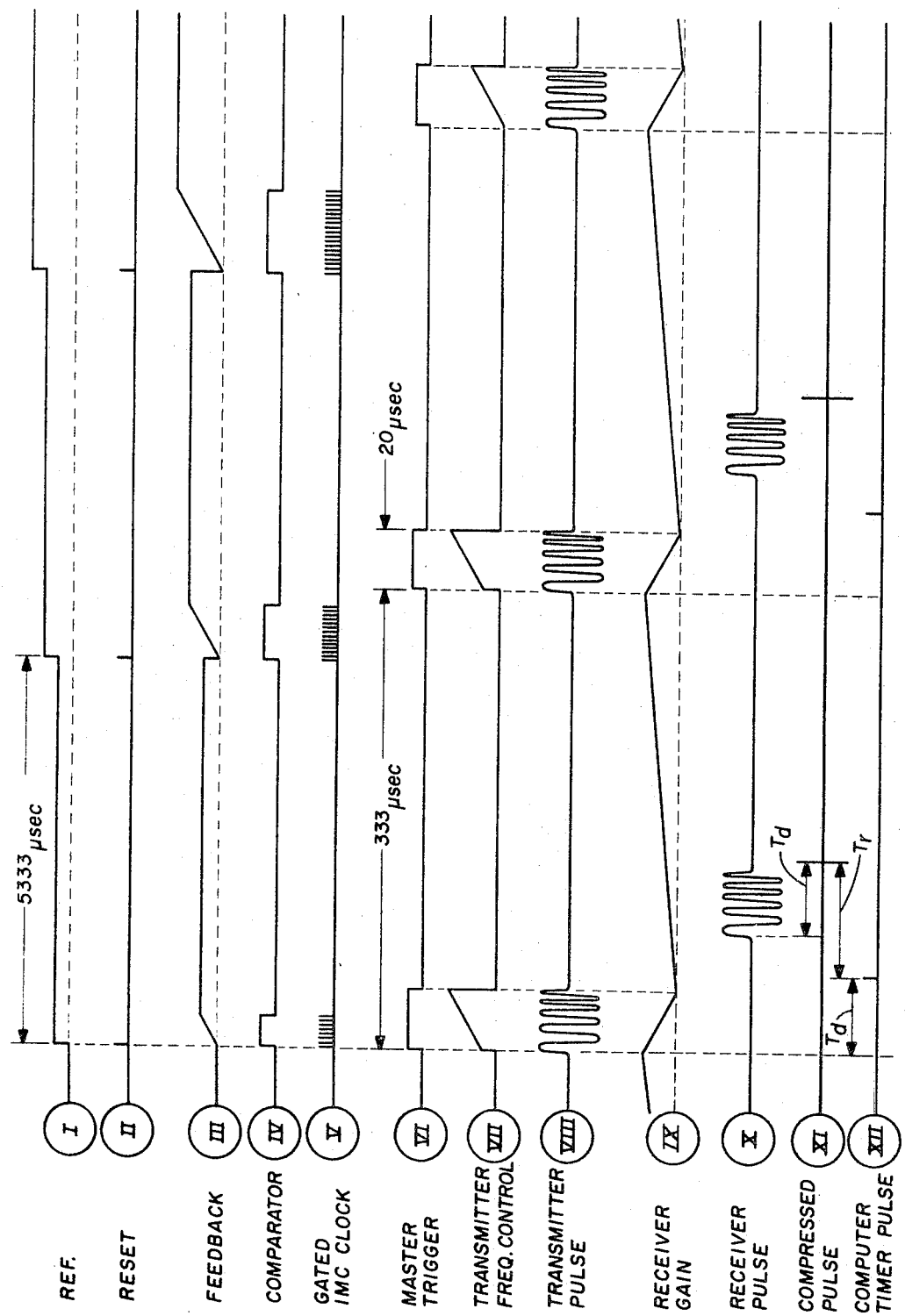
FIGURE 25 is a time plot of the sequence of operation of the radar of FIGURE 4.

In FIGURE 25 Time Graphs I–XII illustrate the operation of the system. Graphs I–V represent the operation of the delay line phase control network and Graphs VI–XII are system timing functions.

The voltage shown on Graph I represents the voltage at the input to the voltage comparator 143, namely the reference voltage applied to terminal 35. The voltage of Graph II is a reset pulse applied to the counters (not shown) to reset the circuits including switches SW1–SW6 to zero upon the appearance of a reference voltage at terminal 35 which is changed from any previous value.

The voltage on Graph III represents the voltage at the output of the converter 153 and applied to the voltage comparator 143. This voltage appears on line 154.

The wave form shown on Graph IV represents the output voltage appearing at the output of the voltage comparator 143. The voltage represented by Graph V represents the output pulses passing through the AND gate 142 and appearing on the input line 140 to the SW–1, which is the first stage in the 9-bit ripple-through phase shift counter.

In operation, when the phase shift counter is reset, the output voltage from the analog converter 153 drops back to zero and then as the delay lines are switched into the circuit by operation of the switches SW1–SW6, the voltage on line 154 builds up until it equals the value of the reference voltage on terminal 35 at which time the switching circuit ceases to change state by reason of the fact that the AND gate 142 is then disabled.

Graph VI illustrates the state of the transmit-receive switches. More particularly, the voltage of the master trigger shown on Graph VI is applied to the control input terminal of the multivibrator 163. The pulse 6$a$ shown in FIGURE 4 actuates a gate circuit so that transmit switches 162, 137 and 120 will be conductive and receive switches 164, 138 and 121 will be nonconductive. During the remainder of each TR cycle, the receive switches 164, 138 and 121 will be conductive.

Graph VII illustrates the variation in the frequency control voltage generated by the pulse compression generator 44 of FIGURE 3. The frequency control voltage is applied to the oscillator 41 to vary the frequency from a low frequency to a high frequency over a band of 1.25 mc. The resultant output of the oscillator 41 is illustrated by Graph VIII. The compression modulated pulse appears at the output of the power amplifier frequency modulated over a range of 1.25 mc. However, as the antenna excitation voltage pulse appears at the output of the frequency multiplier, the modulation range is 5 mc.

Graph IX represents the variation in the gain of the receivers 56 and 57 of FIGURE 3. The gain is controlled by the sensitivity time control unit 67, FIGURE 3. Thus, at the beginning of the listening interval, which is coincident with the onset of the transmitted pulse, the gain is gradually reduced, reaching a minimum level at a time coincident with the end of the transmitted pulse. The gain then is gradually increased as the radar range increases with time to a maximum value at the onset of the next transmitted pulse.

Graph X illustrates the received pulse delayed in time from the transmitted pulse. The received pulse is a compression modulated pulse appearing at the output of the IF amplifiers 56 and 57. The signal is then applied to the pulse compression filters 58 and 59, FIGURE 3, by which means the low frequencies are delayed a greater interval than the high frequencies so that the total energy of the received pulse is compressed, by a ratio of the order of 100 to 1, into a discrete pulse or energy bundle, as illustrated by Graph XI of FIGURE 25. Operation of a pulse compression filter generally speaking is characterized by a time delay $T_d$. Thus the computer timing pulse appearing on Graph XII is delayed by a like interval so that the radar range is represented by the time interval $T_r$.

The foregoing sequence is carried out for the selected values of the reference voltages applied to the input terminal 35 of FIGURE 4. Various programs may be followed to shift the beam from one direction to another at rates and in patterns which are dependent upon the requirements placed upon the system. It will be obvious that the template system above discussed may be used alternately with ground mapping programs and with air to air ranging programs by appropriate programming of the generator of FIGURE 23 which supplies the reference voltages.

The construction of module 14 of FIGURES 1 and 2 as described herein is described and claimed in copending application Ser. No. 397,519, filed Sept. 18. 1964, of Tom M. Hyltin.

The surface-oriented diode illustrated in FIGURES 5–11 is described and claimed in copending application Ser. No. 397,479, filed Sept. 18, 1964, of Gerald Luecke, now U.S. Patent No. 3,375,404, issued Mar. 19, 1968.

The strip-line transmission line illustrated in FIGURES 6, 7 and 12 is described and claimed in copending application Ser. No. 397,492, filed Sept. 18, 1964, of James R. Biard (TI–1901).

The mixer circuit illustrated in FIGURES 5–12 is described and claimed in copending application Ser. No. 397,480, filed Sept. 18, 1964, of Tom M. Hyltin and Philip R. Thomas (TI–1900).

The antenna phase control logic illustrated in FIGURES 22–24 is described and claimed in copending application Ser. No. 397,472, filed Sept. 18, 1964, of Leo A. Chamberlin, Jr., now U.S. Patent No. 3,345,631, issued Oct. 3, 1967.

Circuit stabilization by the dual ground plane construction shown in FIGURE 12 is described and claimed in copending application Ser No. 397,490, filed Sept. 18 1964, of Philip R. Thomas (TI–1902).

Having described the invention in connection with certain spetcific embodiments thereof, it is to be understood that further modifications may now suggest themselves to those skilled in the art and it is intended to cover such modifications as fall within the scope of the appended claims.

What is claimed is:
1. A phased array radar antenna, comprising:
 (a) a manifold having an RF input signal channel and and output signal channel,
 (b) a plurality of modules connected to said manifold structure each of said modules having radiation structure, a transmitting channel for carrying a signal to said radiation structure, a receiving channel leading from said radiation structure, the transmitting channels of each of said modules all in electrical communication with said RF input signal channel in said manifold structure, the receiving channel in each of said modules all in respective electrical communication with said output signal channel in said manifold structure,
 (c) separate phase shift means in each module coupled to a transmission channel and to a receiving channel in the module,
 (d) summing means in said output channel in said manifold structure,
 (e) whereby an RF signal applied to said manifold is distributed by said RF input signal channel to each of said transmitting channels of each of said plurality of modules, and thereafter by each of said transmitting channels via said phase shift means to said radiation structure to radiate electromagnetic energy, and whereby received signals representative of electromagnetic energy, received by said radiation structure are conveyed by said receiving channels via said phase shift means to said output signal channel in said manifold where said received signals are summed in said manifold to provide a result signal from said summing means appearing at an output of said output signal channel and phase shift means controlling the phase relationship of the radiated and received electromagnetic energy with respect to that of the other modules.

2. The antenna as described in claim 1, wherein said transmitting channel of each of said modules includes power amplification means and frequency multiplier means in series with each other and with said phase shift means, and each said module further includes a transmit-receive switch connecting said transmitting channel and said receiving channel to said radiation structure.

3. The antenna as described in claim 1, wherein each of said modules is adapted to be plugged into said manifold structure.

4. In a radar having an antenna formed by a multiplicity of modules each having radiation structure and forming substantially a planar radiation array, the method which comprises:
 (a) applying a relatively low-power pulse of an RF carrier coincident in time and in phase to each of said modules,
 (b) simultantously applying an in phase relatively low-power pulse of a phase control carrier to each of said modules,
 (c) shifting the phase of the phase control carrier pulse in each said module by phase angles depending upon the position of each module in said array and in dependence upon a predetermined beam angle.
 (d) combining each phase shifted phase control carrier pulse with the RF carrier pulse to produce modulation products,
 (e) amplifying to a relatively high power one of the said modulation products from the combined phase control carrier pulse and the RF carrier pulse for excitation of said radiation structure.
 (f) transmitting electromagnetic energy from said radiation structure,
 (g) sensing electromagnetic energy reflected to said radiation structure to produce a received signal in each module,
 (h) shifting said received signal in each module by a phase angle related to the shift in said phase control carrier pulse, and
 (i) combining all of the phase shifted received signals from said modules to produce an output signal.

5. The method of claim 4 including the steps of pulse compression modulating said pulse of RF carrier and registering said output signal as a function of time following the transmission of electromagnetic energy from said radiation structure.

6. In a radar having an antenna formed by a multiplicity of modules each having radiation structure and forming substantially a planar radiation array, the method which comprises:
  (a) applying a low-power pulse of an RF carrier coincident in time and in phase to each of said modules,
  (b) simultaneously applying a low-power pulse of a phase control carrier in phase to each of said modules,
  (c) shifting the phase of the phase control carrier pulse in each said module by phase angles dependent upon the position of each module in said array and in dependence upon a preteremined beam angle,
  (d) mixing each phase shifted phase control carrier pulse with the RF carrier pulse to produce modulation products,
  (e) amplifying one of the said modulation products from the mixed phase control carrier pulse and the RF carrier pulse,
  (f) increasing the frequency of the amplified modulation product and applying said amplified modulation product of increased frequency to said radiation structure for excitation of said antenna.
  (g) generating electromagnetic energy from said antenna at a frequency higher than the frequency of said RF carrier,
  (h) generating a received signal in each module in response to and representative of electromagnetic energy reflected to said antenna,
  (i) shifting said received signal in each module by a phase angle related to the shift in said phase control carrier pulse, and
  (j) summing all of the phase shifted received signals from said modules to produce an output signal indicative of reflectors in the field of said antenna.

7. In a radar having an antenna formed by a multiplicity of modules each having radiation structure and forming substantially a planar radiation array, the method which comprises:
  (a) applying a low-power pulse of an RF carrier coincident in time and in space to each of said modules,
  (b) simultaneously applying a low-power pulse of a phase control carrier in phase to each of said modules,
  (c) shifting the phase of the phase control carrier pulse in each said module by phase angles dependent upon the position of each module in said array and in dependence upon a predetermined beam angle,
  (d) mixing said pulse shifted phase control carrier pulse with the RF carrier pulse to produce modulation products,
  (e) amplifying one of the said modulation products resulting from the mixture of the phase control carrier pulse and the RF carrier pulse.
  (f) multiplying the frequency of the amplified modulation product by a factor $x$ and applying said frequency multiplied amplified modulation product to said radiation structure for excitation of said antenna.
  (g) generating electromagnetic energy from said antenna,
  (h) detecting electromagnetic energy reflected to said radiation structure of said antenna thereby to produce a signal in each module having frequency of $x$ times the frequency of said phase control carrier,
  (i) shifting said signal in each module by a phase angle equal to $x$ times the shift in said phase control carrier pulse, and
  (j) summing all of the phase shifting signals from said modules to produce an output signal indicative of reflectors in the field of said antenna.

8. In the operation of a radar system having an antenna formed by an array of modules, each of said modules having a radiation element, the method which comprises:
  (a) shifting the phase of low power RF signal pulses coincident in time and phase in each said module by first phase angles dependent upon the position of each module in said array and in dependence upon a predetermined beam angle, thereby to provide a plurality of phase shifted low power RF signal pulses respectively in said modules,
  (b) amplifying the phase shifted low power RF signal pulses in said modules to produce a plurality of phase shifted RF signal pulses of enhanced power,
  (c) applying each of the said plurality of phase shifted RF signal pulses of enhanced power respectively to a radiation element of each module, thereby to generate electromagnetic energy,
  (d) generating a received signal in each of said modules in response to and representative of that portion of said electromagnetic energy reflected to each of said radiation elements,
  (e) amplifying and shifting the phase of each of said received signals in each of said modules by phase angles related to the said first phase angles, and
  (f) combining all of the amplified phase shifted received signals from said modules to produce an output signal.

9. In operation of a system for transmitting and receiving electromagnetic energy having an antenna comprised of an array of antenna modules attached to a manifold, each module having radiation structure, the method which comprises:
  (a) applying RF pulses of low power level coincident in time and phase to each of said modules from said manifold,
  (b) shifting the phase angle of the RF pulses of low power level with patterned gradation across said array related to the position of a given module in said array and related to a predetermined antenna beam angle, thereby to produce phase shifted RF pulses of low power level,
  (c) amplifying the phase shifted RF pulses to produce phase shifted RF pulses of enhanced power level,
  (d) multiplying the frequency of the amplified RF pulses,
  (e) applying each of the frequency multiplied, amplified, phase shifted RF pulses to respective ones of said radiation structure, thereby to beam electromagnetic radiation from said array in dependence upon said patterned gradation,
  (f) generating a received signal in each of said modules in response to and representative of that portion of said electromagnetic energy reflected to each of said radiation elements,
  (g) shifting the phase of each of said received signals in each of said modules by phase angles, related to the shift in the phase angles of said RF pulses of low power level, and
  (h) summing all of the said received signals in said manifold to produce an output signal.

10. In the operation of an arrayed antenna radar system, the method which comprises:
  (a) shifting the phase of a phase control carrier by passing the carrier through a phase shift circuit,
  (b) mixing an RF pulse and the phase control carrier to control the phase of the RF pulse,
  (c) amplifying the controlled phase RF pulse to enhance the power thereof to a level in excess of the level to be applied to the radiation structure.
  (d) multiplying the frequency of the controlled phase pulse by a predetermined factor,
  (e) exciting a radiation element in the antenna with the multiplied RF frequency,
  (f) sensing electromagnetic energy reflected to the radiation element to produce a received signal,
  (g) mixing a local frequency with the received signal and detecting an IF signal having a frequency equal to the factor times the frequency of the phase control carrier, and (h) passing the IF signal through the phase shift circuit to a manifold for mixing with similar signals from the other elements of the antenna array.

11. The method of generating ranging data with a multi-element antenna phased array radar which comprises:
  (a) generating a phase reference voltage, a pulsed low power RF signal, a pulsed low power phase control carrier signal, and a local oscillator carrier signal,
  (b) shifting the phase of said phase control carrier signal in dependence upon said phase reference voltage,
  (c) mixing the shifted phase control carrier signal with said RF signal to produce modulation products.
  (d) increasing the power of one of the said modulation products of said RF signal and said shifted phase control carrier signal,
  (e) increasing the frequency of the amplified modulation product,
  (f) radiating pulsed energy from each said antenna element at the increased frequency,
  (g) mixing return signals with said local oscillator carrier signal to produce an IF output signal, and
  (h) shifting the phase of said IF output signal by an amount related to the shifted phase of phase control carrier signal.

References Cited

UNITED STATES PATENTS

| | | |
|---|---|---|
| 3,083,360 | 3/1963 | Welty et al. |
| 3,141,165 | 7/1964 | Kahrilas. |
| 3,182,324 | 5/1965 | Nelson et al. |
| 3,202,991 | 8/1965 | Howells. |
| 3,238,528 | 3/1966 | Hines. |

RODNEY D. BENNETT, *Primary Examiner.*

T. H. TUBBESING, *Assistant Examiner.*